US008690679B2

(12) United States Patent
Amaitis et al.

(10) Patent No.: US 8,690,679 B2
(45) **Date of Patent: *Apr. 8, 2014**

(54) SYSTEM AND METHOD FOR PROVIDING WIRELESS GAMING AS A SERVICE APPLICATION

(75) Inventors: Lee M. Amaitis, London (GB); Joseph M. Asher, New York, NY (US); Robert F. Bahrampour, New York, NY (US); Darrin M. Mylet, Tampa, FL (US); Alan B. Wilkins, Raleigh, NC (US); Howard W. Lutnick, New York, NY (US)

(73) Assignee: CFPH, LLC, New York, NY (US)

( * ) Notice: Subject to any disclaimer, the term of this patent is extended or adjusted under 35 U.S.C. 154(b) by 92 days.

This patent is subject to a terminal disclaimer.

(21) Appl. No.: 13/311,099

(22) Filed: Dec. 5, 2011

(65) Prior Publication Data

US 2012/0077571 A1 Mar. 29, 2012

Related U.S. Application Data

(63) Continuation of application No. 11/199,964, filed on Aug. 9, 2005, now Pat. No. 8,070,604.

(51) Int. Cl.
*A63F 13/00* (2006.01)

(52) U.S. Cl.
USPC .................... 463/41; 463/42; 463/40; 463/39

(58) Field of Classification Search
USPC ...................................................... 463/39–42
See application file for complete search history.

(56) References Cited

U.S. PATENT DOCUMENTS

| | | | |
|---|---|---|---|
| 3,580,581 | A | 5/1971 | Raven |
| 3,838,259 | A | 9/1974 | Kortenhaus |
| 3,876,208 | A | 4/1975 | Wachtler et al. |
| 3,929,338 | A | 12/1975 | Busch |
| 4,101,129 | A | 7/1978 | Cox |
| 4,157,829 | A | 6/1979 | Goldman et al. |
| 4,206,920 | A | 6/1980 | Weatherford et al. |
| 4,216,965 | A | 8/1980 | Morrison et al. |
| 4,238,127 | A | 12/1980 | Lucero et al. |
| 4,240,635 | A | 12/1980 | Brown |
| 4,266,214 | A | 5/1981 | Peters, Jr. |
| 4,335,809 | A | 6/1982 | Wain |
| 4,448,419 | A | 5/1984 | Telnaes |
| 4,467,424 | A | 8/1984 | Hedges et al. |

(Continued)

FOREIGN PATENT DOCUMENTS

| | | | |
|---|---|---|---|
| DE | 31 29 550 | A1 | 4/1982 |
| DE | 37 36 770 | A1 | 5/1989 |

(Continued)

OTHER PUBLICATIONS

*Australian Patent Office Written Opinion and Search Report* for Application No. SG 200605830-9; 11 pages; Nov. 29, 2007.

(Continued)

*Primary Examiner* — Damon Pierce
*Assistant Examiner* — Jeffrey Wong

(57) ABSTRACT

A gaming system is provided. The gaming system allows users to access applications via gaming communication devices coupled to a communication network. At least a portion of the network may be wireless. The gaming applications include gambling, financial, entertainment service, and other types of transactions. The system may include a user location determination feature to prevent users from conducting transactions from unauthorized areas.

29 Claims, 5 Drawing Sheets

(56) References Cited

U.S. PATENT DOCUMENTS

| | | | |
|---|---|---|---|
| 4,492,379 | A | 1/1985 | Okada |
| 4,527,798 | A | 7/1985 | Siekierski et al. |
| 4,572,509 | A | 2/1986 | Stirick |
| 4,573,681 | A | 3/1986 | Okada |
| 4,614,342 | A | 9/1986 | Takashima |
| 4,624,459 | A | 11/1986 | Kaufman |
| 4,636,951 | A | 1/1987 | Harlick |
| 4,648,600 | A | 3/1987 | Oliiges |
| 4,652,998 | A | 3/1987 | Koza et al. |
| 4,692,863 | A | 9/1987 | Moosz |
| 4,760,527 | A | 7/1988 | Sidley |
| 4,805,907 | A | 2/1989 | Hagiwara |
| 4,810,868 | A | 3/1989 | Drexler |
| 4,817,951 | A | 4/1989 | Crouch et al. |
| 4,838,552 | A | 6/1989 | Hagiwara |
| 4,853,884 | A | 8/1989 | Brown et al. |
| 4,856,787 | A | 8/1989 | Itkis |
| 4,858,932 | A | 8/1989 | Keane |
| 4,880,237 | A | 11/1989 | Kishishita |
| 4,909,516 | A | 3/1990 | Kolinsky |
| 4,926,327 | A | 5/1990 | Sidley |
| 4,959,783 | A | 9/1990 | Scott et al. |
| 4,964,638 | A | 10/1990 | Ishida |
| 5,007,087 | A | 4/1991 | Bernstein et al. |
| 5,024,441 | A | 6/1991 | Rousseau |
| 5,048,833 | A | 9/1991 | Lamle |
| 5,050,881 | A | 9/1991 | Nagao |
| 5,055,662 | A | 10/1991 | Hasegawa |
| 5,056,141 | A | 10/1991 | Dyke |
| 5,074,559 | A | 12/1991 | Okada |
| 5,083,785 | A | 1/1992 | Okada |
| 5,096,195 | A | 3/1992 | Gimmon |
| 5,096,202 | A | 3/1992 | Hesland |
| 5,102,134 | A | 4/1992 | Smyth |
| 5,192,076 | A | 3/1993 | Komori |
| 5,229,764 | A | 7/1993 | Matchett et al. |
| 5,242,163 | A | 9/1993 | Fulton |
| 5,251,165 | A | 10/1993 | James, III |
| 5,251,898 | A | 10/1993 | Dickenson et al. |
| 5,263,716 | A | 11/1993 | Smyth |
| 5,265,874 | A | 11/1993 | Dickinson et al. |
| 5,280,426 | A | 1/1994 | Edmonds |
| 5,280,909 | A | 1/1994 | Tracy |
| 5,298,476 | A | 3/1994 | Hotta et al. |
| 5,324,035 | A | 6/1994 | Morris et al. |
| 5,326,104 | A | 7/1994 | Pease et al. |
| 5,344,199 | A | 9/1994 | Carstens et al. |
| 5,351,970 | A | 10/1994 | Fioretti |
| 5,359,183 | A | 10/1994 | Skodlar |
| 5,370,306 | A | 12/1994 | Schulze et al. |
| 5,380,007 | A | 1/1995 | Travis et al. |
| 5,380,008 | A | 1/1995 | Mathis et al. |
| 5,393,061 | A | 2/1995 | Manship et al. |
| 5,398,932 | A | 3/1995 | Eberhardt et al. |
| 5,415,416 | A | 5/1995 | Scagnelli et al. |
| 5,421,576 | A | 6/1995 | Yamazaki et al. |
| 5,429,361 | A | 7/1995 | Raven et al. |
| 5,471,044 | A | 11/1995 | Hotta et al. |
| 5,476,259 | A | 12/1995 | Weingardt |
| 5,505,449 | A | 4/1996 | Eberhardt et al. |
| 5,507,485 | A | 4/1996 | Fisher |
| 5,511,784 | A | 4/1996 | Furry et al. |
| 5,524,888 | A | 6/1996 | Heidel |
| 5,534,685 | A | 7/1996 | Takemoto et al. |
| 5,551,692 | A | 9/1996 | Pettit et al. |
| 5,569,083 | A | 10/1996 | Fioretti |
| 5,569,084 | A | 10/1996 | Nicastro et al. |
| 5,580,309 | A | 12/1996 | Piechowiak et al. |
| 5,586,937 | A | 12/1996 | Menashe |
| 5,588,913 | A | 12/1996 | Hecht |
| 5,613,912 | A | 3/1997 | Slater |
| 5,618,232 | A | 4/1997 | Martin |
| 5,653,634 | A | 8/1997 | Hodges |
| 5,654,746 | A | 8/1997 | McMullan, Jr. et al. |
| 5,655,961 | A | 8/1997 | Acres et al. |
| 5,675,828 | A | 10/1997 | Stoel et al. |
| 5,697,844 | A | 12/1997 | Von Kohorn |
| 5,702,302 | A | 12/1997 | Gauselman |
| 5,707,286 | A | 1/1998 | Carlson |
| 5,738,583 | A | 4/1998 | Comas et al. |
| 5,745,102 | A | 4/1998 | Bloch et al. |
| 5,762,552 | A | 6/1998 | Vuong et al. |
| 5,764,789 | A | 6/1998 | Pare, Jr. et al. |
| 5,766,076 | A | 6/1998 | Pease et al. |
| 5,768,382 | A | 6/1998 | Schneier et al. |
| 5,772,508 | A | 6/1998 | Sugita et al. |
| 5,785,595 | A | 7/1998 | Gauselman |
| 5,816,920 | A | 10/1998 | Hanai |
| 5,833,536 | A | 11/1998 | Davids et al. |
| 5,835,722 | A | 11/1998 | Bradshaw et al. |
| 5,836,817 | A | 11/1998 | Acres et al. |
| 5,851,148 | A | 12/1998 | Brune et al. |
| 5,857,911 | A | 1/1999 | Fioretti |
| 5,871,398 | A | 2/1999 | Schneier et al. |
| 5,878,211 | A | 3/1999 | Delagrange |
| 5,889,474 | A | 3/1999 | LaDue |
| 5,902,983 | A | 5/1999 | Crevelt et al. |
| 5,904,619 | A | 5/1999 | Scagnelli et al. |
| 5,904,620 | A | 5/1999 | Kujawa |
| 5,907,282 | A | 5/1999 | Tuorto et al. |
| 5,910,047 | A | 6/1999 | Scagnelli et al. |
| 5,920,640 | A | 7/1999 | Salatino et al. |
| 5,921,865 | A | 7/1999 | Scagnelli |
| 5,931,764 | A | 8/1999 | Freeman et al. |
| 5,935,005 | A | 8/1999 | Tsuda et al. |
| 5,951,397 | A | 9/1999 | Dickinson |
| 5,954,583 | A | 9/1999 | Green |
| 5,955,961 | A | 9/1999 | Wallerstein |
| 5,959,596 | A | 9/1999 | McCarten et al. |
| 5,970,143 | A | 10/1999 | Schneier et al. |
| 5,977,957 | A | 11/1999 | Miller et al. |
| 5,987,611 | A | 11/1999 | Freund |
| 5,991,431 | A | 11/1999 | Borza et al. |
| 5,995,630 | A | 11/1999 | Borza et al. |
| 5,999,808 | A | 12/1999 | LaDue |
| 6,001,016 | A | 12/1999 | Walker et al. |
| 6,003,013 | A | 12/1999 | Boushy et al. |
| 6,011,973 | A | 1/2000 | Valentine et al. |
| 6,012,636 | A | 1/2000 | Smith |
| 6,012,982 | A | 1/2000 | Piechowiak et al. |
| 6,019,284 | A | 2/2000 | Freeman et al. |
| 6,022,274 | A | 2/2000 | Takeda et al. |
| 6,027,115 | A | 2/2000 | Griswold et al. |
| 6,048,269 | A | 4/2000 | Burns et al. |
| 6,050,622 | A | 4/2000 | Gustafson |
| 6,065,056 | A | 5/2000 | Bradshaw et al. |
| 6,080,061 | A | 6/2000 | Watanabe et al. |
| 6,098,985 | A | 8/2000 | Moody |
| 6,099,408 | A | 8/2000 | Schneier et al. |
| 6,100,804 | A | 8/2000 | Brady et al. |
| 6,104,815 | A | 8/2000 | Alcorn |
| 6,117,011 | A | 9/2000 | Lvov |
| 6,135,884 | A | 10/2000 | Hedrick et al. |
| 6,139,431 | A | 10/2000 | Walker et al. |
| 6,146,270 | A | 11/2000 | Huard et al. |
| 6,148,094 | A | 11/2000 | Kinsella |
| 6,177,905 | B1 | 1/2001 | Welch |
| 6,178,255 | B1 | 1/2001 | Scott et al. |
| 6,178,510 | B1 | 1/2001 | O'Connoe et al. |
| 6,183,366 | B1 | 2/2001 | Goldberg et al. |
| 6,193,153 | B1 | 2/2001 | Lambert |
| 6,196,920 | B1 | 3/2001 | Spaur et al. |
| 6,210,274 | B1 | 4/2001 | Carlson |
| 6,212,392 | B1 | 4/2001 | Fitch et al. |
| 6,219,439 | B1 | 4/2001 | Burger |
| 6,233,448 | B1 | 5/2001 | Alperovich et al. |
| 6,248,017 | B1 | 6/2001 | Roach |
| 6,251,014 | B1 | 6/2001 | Stockdale et al. |
| 6,251,017 | B1 | 6/2001 | Leason et al. |
| 6,264,560 | B1 | 7/2001 | Goldberg et al. |
| 6,265,973 | B1 | 7/2001 | Brammall et al. |
| 6,272,223 | B1 | 8/2001 | Carlson |
| 6,277,026 | B1 | 8/2001 | Archer |
| 6,277,029 | B1 | 8/2001 | Hanley |

(56) References Cited

U.S. PATENT DOCUMENTS 6,280,325 B1 8/2001 Fisk
6,287,202 B1 9/2001 Pascal et al.
6,290,601 B1 9/2001 Yamazaki et al.
RE37,414 E 10/2001 Harlick
6,309,307 B1 10/2001 Krause et al.
6,320,495 B1 11/2001 Sporgis
6,325,285 B1 12/2001 Baratelli
6,325,292 B1 12/2001 Sehr
6,331,148 B1 12/2001 Krause et al.
6,386,976 B1 5/2002 Yamazaki et al.
6,409,602 B1 6/2002 Wiltshire et al.
6,424,029 B1 7/2002 Giesler
6,425,828 B2 7/2002 Walker et al.
6,428,413 B1 8/2002 Carlson
6,441,752 B1 8/2002 Fomukong
RE37,885 E 10/2002 Acres et al.
6,468,155 B1 10/2002 Zucker
6,507,279 B2 1/2003 Loof
6,508,709 B1 1/2003 Karmarkar
6,508,710 B1 1/2003 Paravia et al.
6,509,217 B1 1/2003 Reddy
6,520,853 B2 2/2003 Suzuki
6,524,189 B1 2/2003 Rautila
6,527,641 B1 3/2003 Sinclair et al.
6,542,750 B2 4/2003 Hendrey et al.
6,554,705 B1 4/2003 Cumbers
6,554,707 B1 4/2003 Sinclair
6,556,819 B2 4/2003 Irvin
6,575,834 B1 6/2003 Lindo
6,577,733 B1 6/2003 Charrin
6,582,302 B2 6/2003 Romero
6,585,597 B2 7/2003 Finn
6,612,928 B1 9/2003 Bradford et al.
6,614,350 B1 9/2003 Lunsford et al.
6,618,706 B1 9/2003 Rive et al.
6,622,157 B1 9/2003 Heddaya et al.
6,628,939 B2 9/2003 Paulsen
6,631,849 B2 10/2003 Blossom
6,634,942 B2 10/2003 Walker
6,652,378 B2 11/2003 Cannon et al.
6,676,522 B2 1/2004 Rowe et al.
6,680,675 B1 1/2004 Suzuki
6,682,421 B1 1/2004 Rowe et al.
6,691,032 B1 2/2004 Irish et al.
6,709,333 B1 3/2004 Bradford et al.
6,719,631 B1 4/2004 Tulley et al.
6,721,542 B1 4/2004 Anttila et al.
6,729,956 B2 5/2004 Wolf et al.
6,743,098 B2 6/2004 Urie et al.
6,745,011 B1 6/2004 Hendrickson
6,749,505 B1 6/2004 Kunzle
6,754,210 B1 6/2004 Ofek
6,755,742 B1 6/2004 Hartman
6,756,882 B2 6/2004 Benes
6,761,638 B1 7/2004 Narita
6,773,350 B2 8/2004 Yoshimi et al.
6,778,820 B2 8/2004 Tendler
6,793,580 B2 9/2004 Sinclair
6,800,029 B2 10/2004 Rowe et al.
6,800,031 B2 10/2004 Di Cesare
6,801,934 B1 10/2004 Eranko
6,802,772 B1 10/2004 Kunzle
6,812,824 B1 11/2004 Goldinger et al.
6,834,195 B2 12/2004 Brandenberg et al.
6,837,789 B2 1/2005 Garahi et al.
6,843,412 B1 1/2005 Sanford
6,843,725 B2 1/2005 Nelson
6,846,238 B2 1/2005 Wells et al.
6,857,959 B1 2/2005 Nguyen
6,863,610 B2 3/2005 Vancraeynest
6,868,396 B2 3/2005 Smith et al.
6,884,162 B2 4/2005 Raverdy
6,884,166 B2 4/2005 Leen et al.
6,887,151 B2 5/2005 Leen et al.
6,887,159 B2 5/2005 Leen et al.
6,892,218 B2 5/2005 Heddaya et al.
6,892,938 B2 5/2005 Solomon
6,893,347 B1 5/2005 Zilliacus
6,896,618 B2 5/2005 Benoy et al.
6,898,299 B1 5/2005 Brooks
6,899,628 B2 5/2005 Leen et al.
6,904,520 B1 6/2005 Rosset
6,908,387 B2 6/2005 Hedrick et al.
6,908,391 B2 6/2005 Gatto et al.
6,923,724 B2 8/2005 Williams
6,935,952 B2 8/2005 Walker et al.
6,935,958 B2 8/2005 Nelson
6,942,574 B1 9/2005 Lemay et al.
6,945,870 B2 9/2005 Gatto et al.
RE38,812 E 10/2005 Acres et al.
6,966,832 B2 11/2005 Leen et al.
6,979,264 B2 12/2005 Chatigny et al.
6,979,267 B2 12/2005 Leen et al.
6,984,175 B2 1/2006 Ngyuyen et al.
6,986,055 B2 1/2006 Carlson
6,997,810 B2 2/2006 Cole
7,021,623 B2 4/2006 Leen et al.
7,022,017 B1 4/2006 Halbritter et al.
7,029,394 B2 4/2006 Leen et al.
7,033,276 B2 4/2006 Walker et al.
7,034,683 B2 4/2006 Ghazarian
7,035,653 B2 4/2006 Simon et al.
7,040,987 B2 5/2006 Walker et al.
7,042,360 B2 5/2006 Light et al.
7,042,391 B2 5/2006 Meunier et al.
7,043,641 B1 5/2006 Martinek et al.
7,047,197 B1 5/2006 Bennett
7,056,217 B1 6/2006 Pelkey et al.
7,081,815 B2 7/2006 Runyon et al.
7,097,562 B2 8/2006 Gagner
7,102,507 B1 9/2006 Lauren
7,102,509 B1 9/2006 Anders et al.
7,124,947 B2 10/2006 Storch
7,125,334 B2 10/2006 Yamazaki et al.
7,128,482 B2 10/2006 Meyerhofer et al.
7,144,011 B2 12/2006 Asher et al.
7,147,558 B2 12/2006 Giobbi
7,158,798 B2 1/2007 Lee et al.
7,168,626 B2 1/2007 Lerch et al.
7,185,360 B1 2/2007 Anton et al.
7,194,273 B2 3/2007 Vaudreuil
7,207,885 B2 4/2007 Longman
7,228,651 B1 6/2007 Saari
7,229,354 B2 6/2007 McNutt et al.
7,229,385 B2 6/2007 Freeman et al.
7,233,922 B2 6/2007 Asher et al.
7,248,852 B2 7/2007 Cabrera et al.
7,270,605 B2 9/2007 Russell et al.
7,284,708 B2 10/2007 Martin
7,288,025 B1 10/2007 Cumbers
7,288,028 B2 10/2007 Rodriquez et al.
7,290,264 B1 10/2007 Powers et al.
7,297,062 B2 11/2007 Gatto et al.
7,306,514 B2 12/2007 Amaitis et al.
7,311,605 B2 12/2007 Moser
7,311,606 B2 12/2007 Amaitis et al.
7,316,619 B2 1/2008 Nelson
7,341,517 B2 3/2008 Asher et al.
7,357,717 B1 4/2008 Cumbers
7,394,405 B2 7/2008 Godden
7,413,513 B2 8/2008 Nguyen et al.
7,429,215 B2 9/2008 Rozkin
7,435,179 B1 10/2008 Ford
7,437,147 B1 10/2008 Luciano, Jr.
7,442,124 B2 10/2008 Asher et al.
7,452,273 B2 11/2008 Amaitis et al.
7,452,274 B2 11/2008 Amaitis et al.
7,458,891 B2 12/2008 Asher et al.
7,460,863 B2 12/2008 Steelberg et al.
7,479,065 B1 1/2009 McAllister et al.
7,506,172 B2 3/2009 Bhakta
7,510,474 B2 3/2009 Carter
7,534,169 B2 5/2009 Amaitis et al.
7,546,946 B2 6/2009 Hefner et al.

(56) References Cited

U.S. PATENT DOCUMENTS

| | | | |
|---|---|---|---|
| 7,549,576 | B2 | 6/2009 | Alderucci et al. |
| 7,549,756 | B2 | 6/2009 | Willis et al. |
| 7,562,034 | B2 | 7/2009 | Asher et al. |
| 7,566,270 | B2 | 7/2009 | Amaitis et al. |
| 7,637,810 | B2 | 12/2009 | Amaitis et al. |
| 7,665,668 | B2 | 2/2010 | Phillips |
| 7,686,687 | B2 | 3/2010 | Cannon et al. |
| 7,689,459 | B2 | 3/2010 | Capurso et al. |
| 7,736,221 | B2 | 6/2010 | Black et al. |
| 7,742,972 | B2 | 6/2010 | Lange et al. |
| 7,744,002 | B2 | 6/2010 | Jones et al. |
| 7,828,652 | B2 | 11/2010 | Nguyen et al. |
| 7,867,083 | B2 | 1/2011 | Wells et al. |
| 7,946,917 | B2 | 5/2011 | Kaminkow et al. |
| 7,967,682 | B2 | 6/2011 | Huizinga |
| 8,016,667 | B2 | 9/2011 | Benbrahim |
| 8,047,914 | B2 | 11/2011 | Morrow |
| 8,123,616 | B2 | 2/2012 | Wells et al. |
| 8,142,283 | B2 | 3/2012 | Lutnick |
| 8,267,789 | B2 | 9/2012 | Nelson |
| 8,285,484 | B1 | 10/2012 | Lau |
| 8,298,078 | B2 | 10/2012 | Sutton et al. |
| 2001/0018663 | A1 | 8/2001 | Dusell et al. |
| 2001/0026610 | A1 | 10/2001 | Katz et al. |
| 2001/0026632 | A1 | 10/2001 | Tamai |
| 2001/0027130 | A1 | 10/2001 | Namba et al. |
| 2001/0028308 | A1 | 10/2001 | De La Huerga |
| 2001/0031663 | A1 | 10/2001 | Johnson |
| 2001/0036858 | A1 | 11/2001 | McNutt et al. |
| 2001/0049275 | A1 | 12/2001 | Pierry et al. |
| 2001/0055991 | A1 | 12/2001 | Hightower |
| 2002/0002075 | A1 | 1/2002 | Rowe |
| 2002/0013827 | A1 | 1/2002 | Edstrom et al. |
| 2002/0034978 | A1 | 3/2002 | Legge et al. |
| 2002/0037767 | A1 | 3/2002 | Ebin |
| 2002/0049909 | A1 | 4/2002 | Jackson et al. |
| 2002/0052231 | A1 | 5/2002 | Fioretti |
| 2002/0065097 | A1 | 5/2002 | Brockenbrough |
| 2002/0068631 | A1 | 6/2002 | Raverdy |
| 2002/0073021 | A1 | 6/2002 | Ginsberg et al. |
| 2002/0074725 | A1 | 6/2002 | Stern |
| 2002/0087505 | A1 | 7/2002 | Smith |
| 2002/0095586 | A1 | 7/2002 | Doyle et al. |
| 2002/0111210 | A1 | 8/2002 | Luciano |
| 2002/0111213 | A1 | 8/2002 | McEntee et al. |
| 2002/0119817 | A1 | 8/2002 | Behm |
| 2002/0123377 | A1 | 9/2002 | Shulman |
| 2002/0124182 | A1 | 9/2002 | Bacso |
| 2002/0125886 | A1 | 9/2002 | Bates et al. |
| 2002/0128057 | A1 | 9/2002 | Walker et al. |
| 2002/0132663 | A1 | 9/2002 | Cumbers |
| 2002/0142844 | A1 | 10/2002 | Kerr |
| 2002/0142846 | A1 | 10/2002 | Paulsen |
| 2002/0143960 | A1 | 10/2002 | Goren |
| 2002/0143991 | A1 | 10/2002 | Chow et al. |
| 2002/0147047 | A1 | 10/2002 | Letovsky |
| 2002/0147049 | A1 | 10/2002 | Carter, Sr. |
| 2002/0151344 | A1 | 10/2002 | Tanskanen |
| 2002/0155884 | A1 | 10/2002 | Updike |
| 2002/0157090 | A1 | 10/2002 | Anton, Jr. |
| 2002/0160834 | A1 | 10/2002 | Urie et al. |
| 2002/0160838 | A1 | 10/2002 | Kim |
| 2002/0165020 | A1 | 11/2002 | Koyama |
| 2002/0174336 | A1 | 11/2002 | Sakakibara et al. |
| 2002/0183105 | A1 | 12/2002 | Cannon et al. |
| 2002/0184653 | A1 | 12/2002 | Pierce et al. |
| 2002/0191017 | A1 | 12/2002 | Sinclair |
| 2002/0198044 | A1 | 12/2002 | Walker |
| 2003/0003988 | A1 | 1/2003 | Walker et al. |
| 2003/0003997 | A1 | 1/2003 | Vuong et al. |
| 2003/0006931 | A1 | 1/2003 | Mages |
| 2003/0008662 | A1 | 1/2003 | Stern et al. |
| 2003/0009603 | A1 | 1/2003 | Ruths et al. |
| 2003/0013438 | A1 | 1/2003 | Darby |
| 2003/0013513 | A1 | 1/2003 | Rowe |
| 2003/0014639 | A1 | 1/2003 | Jackson et al. |
| 2003/0017871 | A1 | 1/2003 | Urie et al. |
| 2003/0027631 | A1 | 2/2003 | Hedrick et al. |
| 2003/0028567 | A1 | 2/2003 | Carlson |
| 2003/0031321 | A1 | 2/2003 | Mages |
| 2003/0032407 | A1 | 2/2003 | Mages |
| 2003/0032434 | A1 | 2/2003 | Willner et al. |
| 2003/0032474 | A1 | 2/2003 | Kaminkow |
| 2003/0036425 | A1 | 2/2003 | Kaminkow et al. |
| 2003/0036428 | A1 | 2/2003 | Aasland |
| 2003/0040324 | A1 | 2/2003 | Eldering et al. |
| 2003/0045353 | A1 | 3/2003 | Paulsen et al. |
| 2003/0045354 | A1 | 3/2003 | Globbi |
| 2003/0045358 | A1 | 3/2003 | Leen et al. |
| 2003/0054878 | A1 | 3/2003 | Benoy et al. |
| 2003/0060286 | A1 | 3/2003 | Walker |
| 2003/0064712 | A1 | 4/2003 | Gaston |
| 2003/0064798 | A1 | 4/2003 | Grauzer et al. |
| 2003/0064805 | A1 | 4/2003 | Wells |
| 2003/0064807 | A1 | 4/2003 | Walker et al. |
| 2003/0069071 | A1 | 4/2003 | Britt et al. |
| 2003/0069940 | A1 | 4/2003 | Kavacheri et al. |
| 2003/0078101 | A1 | 4/2003 | Schneider et al. |
| 2003/0087652 | A1 | 5/2003 | Simon et al. |
| 2003/0087701 | A1 | 5/2003 | Paravia et al. |
| 2003/0104865 | A1 | 6/2003 | Itkis et al. |
| 2003/0109306 | A1 | 6/2003 | Karmarkar |
| 2003/0109310 | A1 | 6/2003 | Heaton et al. |
| 2003/0114218 | A1 | 6/2003 | McClintic |
| 2003/0130032 | A1 | 7/2003 | Martinek et al. |
| 2003/0139190 | A1 | 7/2003 | Steelberg |
| 2003/0140131 | A1 | 7/2003 | Chandrashekhar |
| 2003/0148809 | A1 | 8/2003 | Nelson |
| 2003/0148812 | A1 | 8/2003 | Paulsen et al. |
| 2003/0157976 | A1 | 8/2003 | Simon |
| 2003/0162580 | A1 | 8/2003 | Cousineau |
| 2003/0162593 | A1 | 8/2003 | Griswold et al. |
| 2003/0162594 | A1 | 8/2003 | Rowe |
| 2003/0165293 | A1 | 9/2003 | Abeles et al. |
| 2003/0173408 | A1 | 9/2003 | Mosher et al. |
| 2003/0176162 | A1 | 9/2003 | Planki |
| 2003/0176218 | A1 | 9/2003 | Lemay |
| 2003/0177187 | A1 | 9/2003 | Levine et al. |
| 2003/0177347 | A1 | 9/2003 | Schneier et al. |
| 2003/0190944 | A1 | 10/2003 | Manfredi et al. |
| 2003/0195037 | A1 | 10/2003 | Voung et al. |
| 2003/0195043 | A1 | 10/2003 | Shinners et al. |
| 2003/0195841 | A1 | 10/2003 | Ginsberg et al. |
| 2003/0208684 | A1 | 11/2003 | Camacho et al. |
| 2003/0224855 | A1 | 12/2003 | Cunningham |
| 2003/0228895 | A1 | 12/2003 | Edelson |
| 2003/0228898 | A1 | 12/2003 | Rowe |
| 2003/0228907 | A1 | 12/2003 | Gatto et al. |
| 2003/0228910 | A1 | 12/2003 | Jawaharla et al. |
| 2003/0236120 | A1 | 12/2003 | Reece |
| 2004/0002355 | A1 | 1/2004 | Spencer |
| 2004/0002383 | A1 | 1/2004 | Lundy |
| 2004/0002386 | A1 | 1/2004 | Wolfe et al. |
| 2004/0002843 | A1 | 1/2004 | Robarts |
| 2004/0009812 | A1 | 1/2004 | Scott et al. |
| 2004/0014522 | A1 | 1/2004 | Walker et al. |
| 2004/0029635 | A1 | 2/2004 | Giobbi |
| 2004/0034775 | A1 | 2/2004 | Desjardins et al. |
| 2004/0038734 | A1 | 2/2004 | Adams |
| 2004/0048613 | A1 | 3/2004 | Sayers |
| 2004/0053692 | A1 | 3/2004 | Chatingny et al. |
| 2004/0061646 | A1 | 4/2004 | Andrews et al. |
| 2004/0063497 | A1 | 4/2004 | Gould |
| 2004/0066296 | A1 | 4/2004 | Atherton |
| 2004/0068441 | A1 | 4/2004 | Werbitt |
| 2004/0068532 | A1 | 4/2004 | Dewing |
| 2004/0083394 | A1 | 4/2004 | Brebner et al. |
| 2004/0092306 | A1 | 5/2004 | George et al. |
| 2004/0092311 | A1 | 5/2004 | Weston |
| 2004/0097283 | A1 | 5/2004 | Piper |
| 2004/0097287 | A1 | 5/2004 | Postrel |
| 2004/0104274 | A1 | 6/2004 | Kotik et al. |
| 2004/0104845 | A1 | 6/2004 | McCarthy |
| 2004/0110565 | A1 | 6/2004 | Levesque |

(56) References Cited

U.S. PATENT DOCUMENTS

| | | | |
|---|---|---|---|
| 2004/0111369 | A1 | 6/2004 | Lane et al. |
| 2004/0118930 | A1 | 6/2004 | Berardi et al. |
| 2004/0127277 | A1 | 7/2004 | Walker et al. |
| 2004/0127289 | A1 | 7/2004 | Davis |
| 2004/0132530 | A1 | 7/2004 | Rutanen |
| 2004/0137983 | A1 | 7/2004 | Kerr et al. |
| 2004/0137987 | A1 | 7/2004 | Nguyen et al. |
| 2004/0142744 | A1 | 7/2004 | Atkinson et al. |
| 2004/0147323 | A1 | 7/2004 | Cliff et al. |
| 2004/0162124 | A1 | 8/2004 | Barton |
| 2004/0162144 | A1 | 8/2004 | Loose |
| 2004/0186768 | A1 | 9/2004 | Wakim et al. |
| 2004/0189470 | A1 | 9/2004 | Girvin et al. |
| 2004/0192438 | A1 | 9/2004 | Wells et al. |
| 2004/0192442 | A1 | 9/2004 | Wells et al. |
| 2004/0193469 | A1 | 9/2004 | Amaitis et al. |
| 2004/0193531 | A1 | 9/2004 | Amaitis et al. |
| 2004/0198386 | A1 | 10/2004 | Dupray |
| 2004/0198396 | A1 | 10/2004 | Fransioli |
| 2004/0198403 | A1 | 10/2004 | Pedersen et al. |
| 2004/0198483 | A1 | 10/2004 | Amaitis et al. |
| 2004/0209660 | A1 | 10/2004 | Carlson |
| 2004/0209690 | A1 | 10/2004 | Bruzzese |
| 2004/0219961 | A1 | 11/2004 | Ellenby |
| 2004/0224769 | A1 | 11/2004 | Hansen |
| 2004/0225565 | A1 | 11/2004 | Selman |
| 2004/0229685 | A1 | 11/2004 | Smith |
| 2004/0229699 | A1 | 11/2004 | Gentles et al. |
| 2004/0242297 | A1 | 12/2004 | Walker |
| 2004/0242332 | A1 | 12/2004 | Walker et al. |
| 2004/0243504 | A1 | 12/2004 | Asher et al. |
| 2004/0248637 | A1 | 12/2004 | Liebenberg et al. |
| 2004/0248653 | A1 | 12/2004 | Barros et al. |
| 2004/0259626 | A1 | 12/2004 | Akram |
| 2004/0259631 | A1 | 12/2004 | Katz et al. |
| 2004/0266533 | A1 | 12/2004 | Gentles et al. |
| 2005/0001711 | A1 | 1/2005 | Doughty et al. |
| 2005/0003881 | A1 | 1/2005 | Byng |
| 2005/0003888 | A1 | 1/2005 | Asher et al. |
| 2005/0003893 | A1 | 1/2005 | Hogwood et al. |
| 2005/0009600 | A1 | 1/2005 | Rowe et al. |
| 2005/0014554 | A1 | 1/2005 | Walker et al. |
| 2005/0020336 | A1 | 1/2005 | Cesare |
| 2005/0020340 | A1 | 1/2005 | Cannon |
| 2005/0026670 | A1 | 2/2005 | Lardie |
| 2005/0026697 | A1 | 2/2005 | Balahura |
| 2005/0027643 | A1 | 2/2005 | Amaitis et al. |
| 2005/0043996 | A1 | 2/2005 | Silver |
| 2005/0049949 | A1 | 3/2005 | Asher et al. |
| 2005/0054439 | A1 | 3/2005 | Rowe et al. |
| 2005/0059397 | A1 | 3/2005 | Zhao |
| 2005/0059485 | A1 | 3/2005 | Paulsen |
| 2005/0064934 | A1 | 3/2005 | Amaitis et al. |
| 2005/0071481 | A1 | 3/2005 | Danieli |
| 2005/0086301 | A1 | 4/2005 | Eichler et al. |
| 2005/0096109 | A1 | 5/2005 | McNutt et al. |
| 2005/0096133 | A1 | 5/2005 | Hoefelmeyer et al. |
| 2005/0101383 | A1 | 5/2005 | Wells |
| 2005/0107022 | A1 | 5/2005 | Wichelmann |
| 2005/0108365 | A1 | 5/2005 | Becker et al. |
| 2005/0113172 | A1 | 5/2005 | Gong |
| 2005/0116020 | A1 | 6/2005 | Smolucha et al. |
| 2005/0130728 | A1 | 6/2005 | Ngyuen |
| 2005/0131815 | A1 | 6/2005 | Fung et al. |
| 2005/0137014 | A1 | 6/2005 | Vetelainen |
| 2005/0143169 | A1 | 6/2005 | Nguyen et al. |
| 2005/0144484 | A1 | 6/2005 | Wakayama |
| 2005/0159212 | A1 | 7/2005 | Romney et al. |
| 2005/0170886 | A1 | 8/2005 | Miller |
| 2005/0170890 | A1 | 8/2005 | Rowe et al. |
| 2005/0170892 | A1 | 8/2005 | Atkinson |
| 2005/0181859 | A1 | 8/2005 | Lind et al. |
| 2005/0181862 | A1 | 8/2005 | Asher et al. |
| 2005/0181870 | A1 | 8/2005 | Nguyen et al. |
| 2005/0187000 | A1 | 8/2005 | Miller |
| 2005/0187020 | A1 | 8/2005 | Amaitis et al. |
| 2005/0192077 | A1 | 9/2005 | Okuniewicz |
| 2005/0193118 | A1 | 9/2005 | Le et al. |
| 2005/0193209 | A1 | 9/2005 | Saunders et al. |
| 2005/0197189 | A1 | 9/2005 | Schultz |
| 2005/0197190 | A1 | 9/2005 | Amaitis et al. |
| 2005/0209002 | A1 | 9/2005 | Blythe et al. |
| 2005/0215306 | A1 | 9/2005 | O'Donnell et al. |
| 2005/0234774 | A1 | 10/2005 | Dupree |
| 2005/0239523 | A1 | 10/2005 | Longman et al. |
| 2005/0239524 | A1 | 10/2005 | Longman et al. |
| 2005/0239546 | A1 | 10/2005 | Hedrick et al. |
| 2005/0245306 | A1 | 11/2005 | Asher et al. |
| 2005/0245308 | A1 | 11/2005 | Amaitis et al. |
| 2005/0261061 | A1 | 11/2005 | Nguyen et al. |
| 2005/0277471 | A1 | 12/2005 | Russell et al. |
| 2005/0277472 | A1 | 12/2005 | Gillan et al. |
| 2005/0282638 | A1 | 12/2005 | Rowe et al. |
| 2005/0288937 | A1 | 12/2005 | Verdiramo |
| 2006/0005050 | A1 | 1/2006 | Basson et al. |
| 2006/0009279 | A1 | 1/2006 | Amaitis et al. |
| 2006/0016877 | A1 | 1/2006 | Bonalle et al. |
| 2006/0019745 | A1 | 1/2006 | Benbrahim |
| 2006/0035707 | A1 | 2/2006 | Nguyen et al. |
| 2006/0040717 | A1 | 2/2006 | Lind et al. |
| 2006/0040741 | A1 | 2/2006 | Grisworld et al. |
| 2006/0052153 | A1 | 3/2006 | Vlazny et al. |
| 2006/0058102 | A1 | 3/2006 | Nguyen et al. |
| 2006/0068917 | A1 | 3/2006 | Snoddy et al. |
| 2006/0069711 | A1 | 3/2006 | Tsunekawa et al. |
| 2006/0076401 | A1 | 4/2006 | Frerking |
| 2006/0093142 | A1 | 5/2006 | Schneier et al. |
| 2006/0095790 | A1 | 5/2006 | Nguyen et al. |
| 2006/0116198 | A1 | 6/2006 | Leen et al. |
| 2006/0116199 | A1 | 6/2006 | Leen et al. |
| 2006/0116200 | A1 | 6/2006 | Leen et al. |
| 2006/0121970 | A1 | 6/2006 | Khal |
| 2006/0121987 | A1 | 6/2006 | Bortnik et al. |
| 2006/0121992 | A1 | 6/2006 | Bortnik et al. |
| 2006/0131391 | A1 | 6/2006 | Penuela |
| 2006/0135252 | A1 | 6/2006 | Amaitis et al. |
| 2006/0135259 | A1 | 6/2006 | Nancke-Krogh et al. |
| 2006/0148560 | A1 | 7/2006 | Arezina et al. |
| 2006/0148561 | A1 | 7/2006 | Moser |
| 2006/0160626 | A1 | 7/2006 | Gatto et al. |
| 2006/0163346 | A1 | 7/2006 | Lee et al. |
| 2006/0165235 | A1 | 7/2006 | Carlson |
| 2006/0166740 | A1 | 7/2006 | Sufuentes |
| 2006/0178216 | A1 | 8/2006 | Shea et al. |
| 2006/0183522 | A1 | 8/2006 | Leen et al. |
| 2006/0187029 | A1 | 8/2006 | Thomas |
| 2006/0189382 | A1 | 8/2006 | Muir et al. |
| 2006/0194589 | A1 | 8/2006 | Saniska |
| 2006/0199649 | A1 | 9/2006 | Soltys et al. |
| 2006/0205489 | A1 | 9/2006 | Carpenter et al. |
| 2006/0205497 | A1 | 9/2006 | Wells et al. |
| 2006/0209810 | A1 | 9/2006 | Krzyzanowski et al. |
| 2006/0224046 | A1 | 10/2006 | Ramadas et al. |
| 2006/0234631 | A1 | 10/2006 | Dieguez |
| 2006/0234791 | A1 | 10/2006 | Nguyen et al. |
| 2006/0236395 | A1 | 10/2006 | Barker et al. |
| 2006/0246990 | A1 | 11/2006 | Downes |
| 2006/0247026 | A1 | 11/2006 | Walker et al. |
| 2006/0247039 | A1 | 11/2006 | Lerner et al. |
| 2006/0247041 | A1 | 11/2006 | Walker et al. |
| 2006/0247053 | A1 | 11/2006 | Mattila |
| 2006/0252501 | A1 | 11/2006 | Little et al. |
| 2006/0252530 | A1 | 11/2006 | Oberberger et al. |
| 2006/0258429 | A1 | 11/2006 | Manning et al. |
| 2006/0277308 | A1 | 12/2006 | Morse et al. |
| 2006/0277413 | A1 | 12/2006 | Drews |
| 2006/0287092 | A1 | 12/2006 | Walker et al. |
| 2006/0287098 | A1 | 12/2006 | Morrow et al. |
| 2007/0001841 | A1 | 1/2007 | Anders et al. |
| 2007/0003034 | A1 | 1/2007 | Schultz et al. |
| 2007/0015564 | A1 | 1/2007 | Walker et al. |
| 2007/0021213 | A1 | 1/2007 | Foe et al. |
| 2007/0026939 | A1 | 2/2007 | Asher et al. |
| 2007/0032301 | A1 | 2/2007 | Acres et al. |

(56) References Cited

U.S. PATENT DOCUMENTS

| | | | |
|---|---|---|---|
| 2007/0054739 | A1 | 3/2007 | Amaitis et al. |
| 2007/0060305 | A1 | 3/2007 | Amaitis et al. |
| 2007/0060306 | A1 | 3/2007 | Amaitis et al. |
| 2007/0060312 | A1 | 3/2007 | Dempsey et al. |
| 2007/0060326 | A1 | 3/2007 | Juds et al. |
| 2007/0060355 | A1 | 3/2007 | Amaitis et al. |
| 2007/0060358 | A1 | 3/2007 | Amaitis et al. |
| 2007/0066401 | A1 | 3/2007 | Amaitis |
| 2007/0066402 | A1 | 3/2007 | Amaitis |
| 2007/0087834 | A1 | 4/2007 | Moser et al. |
| 2007/0087843 | A1 | 4/2007 | Steil et al. |
| 2007/0093296 | A1 | 4/2007 | Asher et al. |
| 2007/0099697 | A1 | 5/2007 | Nelson |
| 2007/0099703 | A1 | 5/2007 | Terebilo |
| 2007/0117604 | A1 | 5/2007 | Hill |
| 2007/0117634 | A1 | 5/2007 | Hamilton et al. |
| 2007/0136817 | A1 | 6/2007 | Ngyuen |
| 2007/0167237 | A1 | 7/2007 | Wang et al. |
| 2007/0168570 | A1 | 7/2007 | Martin et al. |
| 2007/0181676 | A1 | 8/2007 | Mateen et al. |
| 2007/0190494 | A1 | 8/2007 | Rosenberg |
| 2007/0213120 | A1 | 9/2007 | Beal et al. |
| 2007/0233585 | A1 | 10/2007 | Ben Simon et al. |
| 2007/0238443 | A1 | 10/2007 | Richardson |
| 2007/0238507 | A1 | 10/2007 | Sobel et al. |
| 2007/0241187 | A1 | 10/2007 | Alderucci et al. |
| 2007/0243927 | A1 | 10/2007 | Soltys |
| 2007/0243935 | A1 | 10/2007 | Huizinga |
| 2007/0257101 | A1 | 11/2007 | Alderucci et al. |
| 2007/0258507 | A1 | 11/2007 | Lee et al. |
| 2007/0275779 | A1 | 11/2007 | Amaitis |
| 2007/0281782 | A1 | 12/2007 | Amaitis |
| 2007/0281785 | A1 | 12/2007 | Amaitis |
| 2007/0281792 | A1 | 12/2007 | Amaitis |
| 2007/0282959 | A1 | 12/2007 | Stern |
| 2008/0004121 | A1 | 1/2008 | Gatto et al. |
| 2008/0009344 | A1 | 1/2008 | Graham et al. |
| 2008/0015013 | A1 | 1/2008 | Gelman et al. |
| 2008/0022089 | A1 | 1/2008 | Leedom |
| 2008/0026829 | A1 | 1/2008 | Martin et al. |
| 2008/0026844 | A1 | 1/2008 | Wells et al. |
| 2008/0032801 | A1 | 2/2008 | Brunet de Courssou |
| 2008/0039196 | A1 | 2/2008 | Walther et al. |
| 2008/0051193 | A1 | 2/2008 | Kaminkow et al. |
| 2008/0066111 | A1 | 3/2008 | Ellis et al. |
| 2008/0076505 | A1 | 3/2008 | Nguyen et al. |
| 2008/0076506 | A1 | 3/2008 | Nguyen et al. |
| 2008/0076572 | A1 | 3/2008 | Nguyen et al. |
| 2008/0096659 | A1 | 4/2008 | Kreloff et al. |
| 2008/0102956 | A1 | 5/2008 | Burman et al. |
| 2008/0102957 | A1 | 5/2008 | Burman et al. |
| 2008/0108423 | A1 | 5/2008 | Benbrahim et al. |
| 2008/0113785 | A1 | 5/2008 | Alderucci et al. |
| 2008/0113786 | A1 | 5/2008 | Alderucci et al. |
| 2008/0113787 | A1 | 5/2008 | Alderucci et al. |
| 2008/0113816 | A1 | 5/2008 | Mahaffey et al. |
| 2008/0139306 | A1 | 6/2008 | Lutnick et al. |
| 2008/0146323 | A1 | 6/2008 | Hardy et al. |
| 2008/0150678 | A1 | 6/2008 | Giobbi et al. |
| 2008/0182644 | A1 | 7/2008 | Lutnick et al. |
| 2008/0195664 | A1 | 8/2008 | Maharajh et al. |
| 2008/0207302 | A1 | 8/2008 | Lind et al. |
| 2008/0214261 | A1 | 9/2008 | Alderucci et al. |
| 2008/0218312 | A1 | 9/2008 | Asher et al. |
| 2008/0220871 | A1 | 9/2008 | Asher et al. |
| 2008/0224822 | A1 | 9/2008 | Asher et al. |
| 2008/0254897 | A1 | 10/2008 | Saunders et al. |
| 2008/0305856 | A1 | 12/2008 | Walker et al. |
| 2008/0305867 | A1 | 12/2008 | Guthrie |
| 2008/0311994 | A1 | 12/2008 | Amaitis et al. |
| 2008/0318670 | A1 | 12/2008 | Zinder et al. |
| 2009/0049542 | A1 | 2/2009 | DeYonker et al. |
| 2009/0055204 | A1 | 2/2009 | Pennington et al. |
| 2009/0088232 | A1 | 4/2009 | Amaitis et al. |
| 2009/0098925 | A1 | 4/2009 | Gagner et al. |
| 2009/0117989 | A1 | 5/2009 | Arezina et al. |
| 2009/0149233 | A1 | 6/2009 | Strause et al. |
| 2009/0163272 | A1 | 6/2009 | Baker et al. |
| 2009/0178118 | A1 | 7/2009 | Cedo Perpinya et al. |
| 2009/0183208 | A1 | 7/2009 | Christensen et al. |
| 2009/0197684 | A1 | 8/2009 | Arezina et al. |
| 2009/0204905 | A1 | 8/2009 | Toghia |
| 2009/0209233 | A1 | 8/2009 | Morrison |
| 2009/0325708 | A9 | 12/2009 | Kerr |
| 2010/0062834 | A1 | 3/2010 | Ryan |
| 2010/0069158 | A1 | 3/2010 | Kim |
| 2010/0113143 | A1 | 5/2010 | Gagner et al. |
| 2010/0153511 | A1 | 6/2010 | Lin |
| 2010/0205255 | A1 | 8/2010 | Alderucci |
| 2010/0211431 | A1 | 8/2010 | Lutnick |
| 2010/0240455 | A1 | 9/2010 | Gagner et al. |
| 2012/0190452 | A1 | 7/2012 | Weston et al. |
| 2013/0210513 | A1 | 8/2013 | Nguyen |

FOREIGN PATENT DOCUMENTS

| | | | |
|---|---|---|---|
| DE | 43 16 652 | A1 | 11/1994 |
| DE | 19922862 | | 12/2000 |
| DE | 19944140 | | 3/2001 |
| DE | 19952691 | | 5/2001 |
| DE | 19952692 | | 5/2001 |
| DE | 10060079 | | 6/2002 |
| EP | 0 840 639 | B1 | 7/1996 |
| EP | 0 506 873 | B1 | 3/2000 |
| EP | 1045346 | | 10/2000 |
| EP | 1063622 | | 12/2000 |
| EP | 1 066 868 | A2 | 1/2001 |
| EP | 1120757 | | 1/2001 |
| EP | 1 202 528 | A3 | 5/2002 |
| EP | 1217792 | | 6/2002 |
| EP | 1231577 | | 8/2002 |
| EP | 1291830 | A2 | 3/2003 |
| EP | 1 475 755 | A1 | 12/2003 |
| EP | 1 475 756 | A2 | 11/2004 |
| EP | 1480102 | A2 | 11/2004 |
| EP | 1 531 646 | A1 | 5/2005 |
| EP | 1259930 | B1 | 6/2005 |
| EP | 1480102 | A3 | 10/2008 |
| GB | 2 248 404 | | 4/1992 |
| GB | 2 256 594 | | 12/1992 |
| GB | 2 391 432 | | 2/2004 |
| GB | 2 391 767 | | 2/2004 |
| GB | 2394675 | | 5/2004 |
| GB | 2 406 291 | | 3/2005 |
| JP | H11-220766 | | 1/1988 |
| JP | 5-317485 | | 12/1993 |
| JP | 2000-69540 | | 8/1998 |
| JP | 2000049046 | | 2/2000 |
| JP | 2000-160016 | | 6/2000 |
| JP | 200218125 | | 7/2000 |
| JP | 200326491 | | 10/2000 |
| JP | 200345435 | | 11/2000 |
| JP | 200387614 | | 12/2000 |
| JP | 2001-70658 | | 3/2001 |
| JP | 2001-204971 | | 7/2001 |
| JP | 2001-204972 | | 7/2001 |
| JP | 2001/212363 | | 8/2001 |
| JP | 2001 236458 | | 8/2001 |
| JP | 2001-340656 | | 12/2001 |
| JP | 2001-344400 | | 12/2001 |
| JP | 2001-526550 | | 12/2001 |
| JP | 2002 032515 | | 1/2002 |
| JP | 2002-049681 | | 2/2002 |
| JP | 2002-056270 | | 2/2002 |
| JP | 2002107224 | | 2/2002 |
| JP | 2002-109376 | | 4/2002 |
| JP | 2002-66144 | | 5/2002 |
| JP | 2002 133009 | | 5/2002 |
| JP | 2002-135468 | | 5/2002 |
| JP | 2002 189831 | | 7/2002 |
| JP | 2002-253866 | | 9/2002 |
| JP | 2002-263375 | | 9/2002 |
| JP | 2002-292113 | | 10/2002 |
| JP | 2003-053042 | | 2/2003 |

(56) References Cited

FOREIGN PATENT DOCUMENTS

| | | |
|---|---|---|
| JP | 2003 078591 | 3/2003 |
| JP | 2003-518677 | 6/2003 |
| JP | 2003166050 | 6/2003 |
| JP | 2003-210852 | 7/2003 |
| JP | 2002024979 | 8/2003 |
| JP | 2002 149894 | 5/2004 |
| JP | 2004-261202 | 9/2004 |
| JP | 2004-321558 | 11/2004 |
| JP | 2004-536638 | 12/2004 |
| JP | 2005-073711 | 3/2005 |
| JP | 2007-011420 | 1/2007 |
| RU | 2190477 | 10/2002 |
| WO | WO93/10508 | 5/1993 |
| WO | WO 94/10658 | 5/1994 |
| WO | WO 94/16416 | 7/1994 |
| WO | WO 95/30944 | 11/1995 |
| WO | WO97/44750 | 11/1997 |
| WO | WO 99/04873 A1 | 2/1999 |
| WO | WO 99/08762 A1 | 2/1999 |
| WO | WO 99/19027 | 4/1999 |
| WO | WO99/42964 | 8/1999 |
| WO | WO 99/52077 | 10/1999 |
| WO | WO 99/55102 | 10/1999 |
| WO | WO 00/77753 A1 | 12/2000 |
| WO | 01/20538 | 3/2001 |
| WO | WO 01/17262 A1 | 3/2001 |
| WO | WO 02/37246 | 5/2001 |
| WO | WO 01/40978 A2 | 6/2001 |
| WO | WO 01/48712 A1 | 7/2001 |
| WO | WO 01/48713 | 7/2001 |
| WO | WO 01/48713 A1 | 7/2001 |
| WO | WO 01/54091 | 7/2001 |
| WO | 01/67218 | 9/2001 |
| WO | WO 01/82176 | 11/2001 |
| WO | WO 01/84817 A1 | 11/2001 |
| WO | WO 01/89233 A3 | 11/2001 |
| WO | WO 02/10931 A1 | 2/2002 |
| WO | WO 02/21457 A1 | 3/2002 |
| WO | WO 02/31739 | 4/2002 |
| WO | WO 02/39605 A1 | 5/2002 |
| WO | WO 02/41199 A3 | 5/2002 |
| WO | WO 02/47042 | 6/2002 |
| WO | WO 02/065750 A2 | 8/2002 |
| WO | WO 02/071351 A2 | 9/2002 |
| WO | WO 02/077931 A1 | 10/2002 |
| WO | WO02/101486 | 12/2002 |
| WO | WO 03/005743 | 1/2003 |
| WO | 03/015299 A1 | 2/2003 |
| WO | WO 03/013678 A1 | 2/2003 |
| WO | WO 03/021543 | 3/2003 |
| WO | WO 03/027970 A2 | 4/2003 |
| WO | 03/045519 | 6/2003 |
| WO | 03/081447 | 10/2003 |
| WO | WO 2004/000428 A1 | 12/2003 |
| WO | WO 2004/003810 A1 | 1/2004 |
| WO | WO 2004/013820 | 2/2004 |
| WO | WO 2004/014506 A1 | 2/2004 |
| WO | WO 2004/023253 A3 | 3/2004 |
| WO | 2004/027689 A2 | 4/2004 |
| WO | WO 2004/034223 | 4/2004 |
| WO | WO 2004/073812 A2 | 9/2004 |
| WO | WO 2004/095383 | 11/2004 |
| WO | WO 2004/104763 A2 | 12/2004 |
| WO | WO 2004/114235 A1 | 12/2004 |
| WO | WO 2005/001651 | 1/2005 |
| WO | WO 2005/015458 A1 | 2/2005 |
| WO | WO 2005/022453 | 3/2005 |
| WO | WO 2005/026870 A2 | 3/2005 |
| WO | WO 2005/031627 A1 | 4/2005 |
| WO | WO 2005/031666 A1 | 4/2005 |
| WO | WO 2005/036425 A1 | 4/2005 |
| WO | WO 2005/050574 A2 | 6/2005 |
| WO | WO 2005/082011 | 9/2005 |
| WO | WO2005/098650 | 10/2005 |
| WO | 2006/023230 | 3/2006 |
| WO | WO 2007/008601 A2 | 1/2007 |
| WO | WO97/19537 | 5/2007 |
| WO | WO 2008/005264 | 1/2008 |
| WO | WO 2008/016610 | 2/2008 |

OTHER PUBLICATIONS

*Notification of Transmittal of the International Search Report and the Written Opinion of the International Searching Authority* for International Application No. PCT/US06/26348; 9 pages; Dec. 28, 2007.

*United States Patent and Trademark Office: Office Action* for Application No. 11/063,311, filed Feb. 21, 2005, in the name of Lee M. Amaitis; Examiner Travis R. Banta; 18 pages ; May 4, 2007.

*United States Patent and Trademark Office: Office Action* for U.S. Appl. No. 11/063,311, filed Feb. 21, 2005 in the name of Lee M. Amaitis; Examiner Travis R. Banta; 27 pages; Oct. 31, 2007.

Janna Lindsjö, et al.; *GIGANT—an Interactive, Social, Physical and Mobile Game*; PDC 2002 Proceedings of the Participatory Design Conference; Malmö, Sweden; 5 pages; Jun. 23-25, 2002.

*Notification of Transmittal of the International Search Report and the Written Opinion of the International Searching Authority* for International Application PCT/US06/26599; 7 pages; Sep. 24, 2007.

*Notification of Transmittal of the International Search Report and the Written Opinion of the International Searching Authority* for International Application PCT/US06/06315; 10 pages; Sep. 24, 2007.

*USPTO Office Action Summary* for U.S. Appl. No. 11/201,812, filed Aug. 10, 2005; 32 pages; Sep. 27, 2007.

Stephan Neuert, et al.; The British Library; *Delivering Seamless Mobile Services Over Bluetooth*; 11 pages; date unknown.

Business Wire; *Home Gambling Network Inc., With U.S. Patent 5,800,268—Business/Gambling—HGN and UUNET, a WorldCom/MCI Company, Reach a Mutually Satisfactory Resolution in Patent Suit*; 2 pages ; Mar. 19, 1999.

PR Newswire; *Nokia N-Gage (TM) Mobile Game Deck—The Revolutionary Gaming Experience; Major Global Games Publishers Excited to Publish on Wireless Multiplayer Platform*; 3 pages; Feb. 6, 2003.

Business Wire; *GoldPocket Interactive Launches EM Mobile Matrix, Industry's First Fully Synchronous Interactive Television and Massively Multi-Player Gaming Solution*; 2 pages; Mar. 17, 2003.

Brand Strategy; *The National Lottery has announced that UK consumers will be able to purchase tickets using the internet, TV and Mobile phones*. (Launches & Rebrands); ISSN 0965-9390; 1 pages; 04/00/2003.

PR Newswire; *Ideaworks3D appointed by Eidos Interactive to Develop Blockbuster Line-up for Nokia N-Gage Mobile Game Deck*; 2 pages; May 23, 2003.

Telecomworldwire; *New mobile lottery service launched by mLotto*; 1 pages; Oct. 30, 2003.

Singh, et al.; *Anywhere, Any-Device Gaming*; Human Interface Technology Laboratory; National University of Singapore; 4 pages; 2004.

Wu, et al; The Electronic Library; *Real Tournament—Mobile Context-Aware Gaming for the Next Generation*; vol. 22; No. 1; ISBN 0-86176-934-1; ISSN 0264-0473; 11 pages; 2004.

*Precision Marketing*; vol. 16, No. 11; ISSN 0955-0836; 2 pages; Jan. 9, 2004.

Online Reporter; *GTECH Takes Lottery Mobile*; 1 page; Feb. 28, 2004.

Personal and Ubiquitous Computing; *Human Pacman: a mobile, wide-area entertainment system based on physical, social, and ubiquitous computing*; 12 pages; May 2004.

PR Newswire; *M7 Networks Partners With Terraplay to Deliver Real-Time Multiplayer Gaming Functionality to Its Community Services Offerings*; 2 pages; Jun. 1, 2004.

China Telecom; *Win Win Gaming Inc. announces agreement to provide wireless lottery and entertainment content in Shanghai*; vol. 11, No. 9; 2 pages; 09/00/2004.

Business Wire; *EA Announces Next Step Into Mobile Gaming; Digital Bridges Named as Strategic Partner for Distribution of Mobile Interactive Entertainment in Europe, North and South America*; 3 pages; Sep. 2, 2004.

Wireless News; *Mobile Casinos, Lotteries Good News for Mobile Revenues*; 2 pages; Feb. 23, 2005.

(56) References Cited

OTHER PUBLICATIONS

Business Wire; *MobileGamingNow, Inc. Announces the Launch of the First Ever Mobile Phone Interactive, Multi-Player Gaming System for Poker*; 2 pages; Apr. 4, 2005.
Business Wire; *InfoSpace's Golf Club 3D Scores Hole-in-One for Exciting and Realistic Game Play; InfoSpace's 3D Golf Captures the Challenge and Realism of the Sport With Real-Time 3D Animation, Weather Effects, and Customizable Characters*; 2 pages; Apr. 21, 2005.
Business Wire; *July Systems' Play2Win Interactive Game Service Launched on UK's MobileGaming.com; Speedy Customer Deployments Now Possible With July's New UK Mobile Retailing Infrastructure*; 2 pages; May 4, 2005.
Gaming Labs Certified™; Standard Series; *GLI-26: Wireless Gaming System Standards*; Version: 1.1; 28 pages; Jan. 18, 2007.
*Notification of Transmittal of the International Search Report and the Written Opinion of the International Searching Authority, or the Declaration*, for International Application No. PCT/US06/26343, 8 pages , Jan. 19, 2007.
*Notification of Transmittal of the International Search Report and the Written Opinion of the International Searching Authority, or the Declaration*, for International Application No. PCT/US06/26600, 8 pages, Jan. 19, 2007.
*Notification of Transmittal of the International Search Report and the Written Opinion of the International Searching Authority, or the Declaration* for International Application No. PCT/US06/26346, 8 pages, Mar. 29, 2007.
*Notification of Transmittal of the International Search Report and the Written Opinion of the International Searching Authority, or the Declaration* for International Application No. PCT/US05/05905, 10 pages, Apr. 10, 2007.
Gaming Labs Certified™; Standard Series; *GLI-11: Gaming Devices in Casinos*; Version: 2.0; 96 pages; Apr. 20, 2007.
*Notification of Transmittal of the International Search Report and the Written Opinion of the International Searching Authority, or the Declaration* for International Application No. PCT/US06/26350, 8 pages, Apr. 27, 2007.
Gaming Labs Certified™; Standard Series; *GLI-21: Client-Server Systems*; Version: 2.1; 85 pages; May 18, 2007.
USPTO Office Action for U.S. Appl. No. 11/418,939, Dec. 17, 2007 (13 pages).
USPTO Office Action for U.S. Appl. No. 11/418,939, Aug. 20, 2008 (12 pages).
USPTO Office Action for U.S. Appl. No. 11/418,939, Apr. 10, 2007.
*United States Patent and Trademark Office, Office Action* for U.S. Appl. No. 11/210,482; 26 pages; Jul. 27, 2007.
*Australian Patent Office; Examination Report* for Singapore Patent Application No. 0605830-9; 5 pages; Jul. 7, 2008.
*PCT Notification of Transmittal of the International Search Report and the Written Opinion of the International Searching Authority* for International Application No. PCT/US07/66873; 4 pages; Aug. 4, 2008.
*PCT Notification of Transmittal of the International Search Report and the Written Opinion of the International Searching Authority* for International Application No. PCT/US2008/057239; 8 pages; Aug. 7, 2008.
U.S. PTO Office Action for Patent U.S. Appl. No. 11/199,831; 9 pages; Dec. 19, 2008.
U.S. PTO Office Action for Patent U.S. Appl. No. 11/256,568; 17 pages; Oct. 21, 2008.
U.S. PTO Office Action for Patent U.S. Appl. No. 10/835,995; 11 pages; Jan. 22, 2009.
U.S. PTO Office Action for Patent U.S. Appl. No. 11/406,783; Feb. 9, 2009.
Australian Examination Report for AU Application 2006269418; 2 pages; Mar. 12, 2009.
U.S. PTO Office Action for Patent U.S. Appl. No. 11/063,311; 14 pages; Apr. 29, 2009.
U.S. PTO Office Action for Patent U.S. Appl. No. 11/210,482; 24 pages; Apr. 29, 2009.
U.S. PTO Office Action for U.S. Appl. No. 11/683,476; 8 pages; Jun. 24, 2009.
U.S. PTO Office Action for U.S. Appl. No. 10/897,822; 7 pages; Jan. 23, 2009.
U.S. PTO Office Action for U.S. Appl. No. 10/897,822; 7 pages; Jul. 16, 2008.
U.S. PTO Office Action for U.S. Appl. No. 10/897,822; 14 pages; Aug. 31, 2007.
U.S. PTO Office Action for U.S. Appl. No. 10/897,822; 16 pages; Feb. 22, 2007.
U.S. PTO Office Action for U.S. Appl. No. 10/897,822; 17 pages; Aug. 5, 2009.
U.S. PTO Office Action for U.S. Appl. No. 10/897,822; 7 pages; Feb. 6, 2008.
Applicants Summary of Interview with Examiner dated 6/13/7 for U.S. Appl. No. 10/897,822; 2 pages.
EPO Examination Report for EP Application No. 05775503.5-1238 dated Jul. 23, 2007; 5; 5 pages.
PCT International Search Report and Written Opinion for International Application No. PCT/US2005/025722; 05112002; 11 pages.
U.S. PTO Office Action for U.S. Appl. No. 11/686,354; Oct. 1, 2009; 9 pages.
Canadian Examination Report for CA Application No. 2613338; 4 pages; Oct. 5, 2009.
Notice of Allowance for U.S. Appl. No. 11/406,783; 6 pages; 9/28/9.
International Search Report for International Application No. PCT/US07/84669; 2 pages; Jun. 6, 2008;.
USPTO Office Action for U.S. Appl. No. 11/553,130, Dec. 24, 2008 (12 pages).
USPTO Office Action for U.S. Appl. No. 11/553,142, Dec. 23, 2008 (11 pages).
USPTO Office Action for U.S. Appl. No. 11/553,130, Oct. 6, 2009 (14 pages).
USPTO Office Action for U.S. Appl. No. 11/553,142, Sep. 3, 2009 (28 pages).
Canadian Examination Report for CA Application No. 2613362; 4 pages; Oct. 13, 2009.
Notice of Allowance for U.S. Appl. No. 11/199,831; 5 pages; Oct. 21, 2009.
U.S. PTO Office Action for U.S. Appl. No. 11/557,131; 7 pages; 9/29/9.
AU 1st examination report for AU Application No. 2006269267; Feb. 16, 2009; 4 pages.
AU 2nd examination report for AU Application No. 2006269267; Oct. 21, 2009; 5 pages.
U.S. PTO Office Action for U.S. Appl. No. 11/557,125; 10 pages; Nov. 9, 2009.
USPTO Office Action for U.S. Appl. No. 11/559,829, mailed Nov. 3, 2009, 22 pages.
USPTO Office Action for U.S. Appl. No. 11/559,933, mailed Oct. 20, 2009, 17 pages.
USPTO Office Action for U.S. Appl. No. 11/559,484, mailed Nov. 3, 2009, 31 pages.
U.S. PTO Office Action for U.S. Appl. No. 11/199,964; 18 pages; Nov. 30, 2009.
U.S. PTO Office Action for U.S. Appl. No. 11/683,476; 12 pages; 12/24/9.
International Search Report and Written Opinion for PCT Application PCT/US2010/023579; 13 pages; Apr. 16, 2010.
Notice of Acceptance for AU Application No. 2006269267; 8 pages; May 3, 2010.
Canadian Office Action for CA Application No. 2613084; Mar. 29, 2010; 4 pages.
Notice of Allowance for U.S. Appl. No. 11/686,354; Apr. 29, 2010; 6 pages.
U.S. PTO Office Action for U.S. Appl. No. 11/199,964; 15 pages; May 25, 2010.
U.S. PTO Office Action for U.S. Appl. No. 11/683,508; 10 pages; Apr. 15, 2010.
Notice of Allowance for U.S. Appl. No. 11/256,568; 18 pages; Jun. 7, 2010.
U.S. PTO Office Action for U.S. Appl. No. 11/685,997; May 12, 2010; 11 pages.

(56) References Cited

OTHER PUBLICATIONS

U.S. PTO Office Action for U.S. Appl. No. 11/681,443; 11pages; Jan. 11, 2010.
Notice of Allowability for U.S. Appl. No. 11/199,835; Apr. 10, 2009; 2 pages.
Notice of Panel Decision for U.S. Appl. No. 11/553,142; 2 pages; Feb. 3, 2010.
Notice of Panel Decision for U.S. Appl. No. 11/553,130; 2 pages; May 13, 2010.
Office Action for Japanese Patent Application No. 2007-500972; Feb. 23, 2010; 3 pages; with translation 3 pages.
Office Action for Japanese Patent Application No. 2007-556420; Feb. 23, 2010; 4 pages; with translation 4 pages.
AU Examination Report for AU Application No. 2006269413; 2 pages; Apr. 29, 2009.
Notice of Acceptance for AU Application No. 2006269420 ; 16 pages; May 3, 2010.
AU Examination Report for AU Application No. 2006269413; 2 pages; Sep. 7, 2009.
Canadian Examination Report for CA Application No. 2613335; 4 pages; Mar. 29, 2010.
Office Action for Japanese Patent Application No. 2008-520419 ; Feb. 2, 2010; 8 pages; with translation 8 pages.
AU Examination Report for AU Application No. 2008239516; 3 pages; May 14, 2010.
AU Examination Report for AU Application No. 2008201005; 3 pages; Aug. 11, 2009.
AU Examination Report for AU Application No. 2007216729; 5 pages; Jan. 16, 2009.
U.S. PTO Office Action for Patent Application No. 11/559,829; 29 pages; Jun. 22, 2010.
U.S. PTO Office Action for U.S. Appl. No. 10/897,822; 14 pages; Feb. 4, 2010.
Applicants Response, Claims, Arguments and Remarks dated Dec. 7, 2009 for U.S. Appl. No. 10/897,822; 18 pages.
AU Examination Report for AU Application No. 2007319235; Jul. 6, 2010; 2 pages.
AU Examination Report for AU Application No. 2006269418; 2 pages; Oct. 27, 2009.
AU Examination Report for AU Application No. 2006269416; 4 pages; Jun. 10, 2009.
U.S. PTO Office Action for U.S. Appl. No. 10/835995; 11 pages; Jul. 12, 2010.
U.S. PTO Office Action for U.S. Appl. No. 11/559,484; 19 pages; Jul. 20, 2010.
U.S. PTO Office Action for U.S. Appl. No. 11/559,933; 37 pages; Jul. 20, 2010.
U.S. PTO Office Action for U.S. Appl. No. 10/395,963; 22 pages; Jul. 2, 2010.
U.S. PTO Office Action for U.S. Appl. No. 10/395,963; 26 pages; Dec. 18, 2009.
U.S. PTO Office Action for U.S. Appl. No. 10/395,963; 18 pages; Jun. 9, 2009.
U.S. PTO Office Action for U.S. Appl. No. 10/395,963; 16 pages; Jan. 21, 2009.
U.S. PTO Office Action for U.S. Appl. No. 10/395,963; 11 pages; Jul. 21, 2008.
U.S. PTO Office Action for U.S. Appl. No. 10/395,963; 3 pages; Mar. 10, 2008.
U.S. PTO Office Action for U.S. Appl. No. 10/395,963; 13 pages; Jan. 8, 2008.
Applicants Response, Claims, Arguments and Remarks dated Oct. 31, 2007 for U.S. Appl. No. 10/395,963; 14 pages.
U.S. PTO Office Action for U.S. Appl. No. 10/395,963; 12 pages; Sep. 19, 2007.
U.S. PTO Office Action for U.S. Appl. No. 10/395,963; 12 pages; Mar. 29, 2007.
U.S. PTO Office Action for U.S. Appl. No. 10/395,963; 7 pages; May 8, 2006.
US PTO Office Action for U.S. Appl. No. 10/395,988 ; Jan. 9, 2007; 7 pages.
US PTO Office Action for U.S. Appl. No. 10/395,988 ; Aug. 15, 2007; 4 pages.
US PTO Office Action for U.S. Appl. No. 12/367,566; Jul. 20, 2010; 8 pages.
US PTO Office Action for U.S. Appl. No. 10/395,988 ; Apr. 28, 2010; 9 pages.
Advisory Action for U.S. Appl. No. 10/395,963; 4 pages; May 4, 2009.
Advisory Action for U.S. Appl. No. 10/395,963; 3 pages; Apr. 8, 2008.
Examiner Interview Summary Record for U.S. Appl. No. 10/395,963; 5 pages; Apr. 7, 2008.
Miscellaneous Communication to Applicant for U.S. Appl. No. 10/395,963; 2 pages; Oct. 11, 2006.
Advisory Action for U.S. Appl. No. 10/395,963; 4 pages; Sep. 17, 2009.
Examiner Interview Summary Record for U.S. Appl. No. 10/897,822; 4 pages; Jun. 13, 2007.
AU Examination Report for AU Application No. 2006216723; Our ref: 04-7136WOAU; 2 pages; Jul. 1, 2010.
CA Examination Report for CA Application No. 2612896; Aug. 30, 2010; 4 pages.
CA Examination Report for CA Application No. 2613333; Aug. 30, 2010; 4 pages.
Notice of Panel Decision from Pre Appeal Brief Review for U.S. Appl. No. 11/199,964; 2 pages; Dec. 21, 2010.
US PTO Office Action for U.S. Appl. No. 11/683,476; Dec. 7, 2010; 11 pages.
US PTO Office Action for U.S. Appl. No. 11/683,058; 11 pages.
US PTO Office Action for U.S. Appl. No. 12/367,566; Dec. 9, 2010; 17 pages.
NZ Examination Report for NZ Application No. 577177; Dec. 17, 2010; 2 pages.
AU Examination Report for AU Application No. 2008201005; Dec. 17, 2010; 4 pages.
CA Examination report for CA Application No. 2596474; Nov. 15, 2010; 6 pages.
US PTO Office Action for U.S. Appl. No. 11/685,997; Jan. 21, 2011; 12 pages.
US PTO Office Action for U.S. Appl. No. 11/839,412; Jan. 20, 2011; 20 pages.
US PTO Office Action for U.S. Appl. No. 11/839,404; Jan. 19, 2011; 19 pages.
Notice of Allowance for U.S. Appl. No. 11/557,125; 7 pages; Jan. 21, 2011.
UK Office Action for Application No. 0910202.1 dated Dec. 21, 2010; 7 pages.
AU Examiners Report for Application No. 2005216239 dated Jan. 5, 2011; 2 pages.
JP Office Action for Application No. 2008-520419; Feb. 15, 2011; 8 pages total with English Translation.
US PTO Office Action for U.S. Appl. No. 11/683,508; Jan. 5, 2011; 27 pages.
Notice of Allowance for U.S. Appl. No. 11/686,354; Mar. 3, 2011; 8 pages.
U.S. PTO Office Action for U.S. Appl. No. 11/839,418; 15 pages; Feb. 10, 2011.
Notice of Allowance for U.S. Appl. No. 11/199,964; Mar. 2, 2011; 7 pages.
Examination Report for AU Application No. 2010212278 dated Feb. 15, 2011; 1 page.
JP Office Action for Application No. 2008-520393; Jan. 24, 2011; 8 pages total with English Translation.
U.S. PTO Office Action for U.S. Appl. No. 11/839,425; Mar. 3, 2011; 64 pages.
U.S. PTO Office Action for U.S. Appl. No. 10/835,995; 52 pages; Mar. 15, 2011.
U.S. PTO Office Action for U.S. Appl. No. 12/247,623; 10 pages; Mar. 21, 2011.
Notice of Acceptance for AU Application No. 2006269416 dated Mar. 9, 2011; 3 pages.

(56) References Cited

OTHER PUBLICATIONS

Chinese Office Action for Application No. 200580009075.5 dated Oct. 26, 2010; 7 pages.
Chinese Office Action for Application No. 200580009075.5 dated Sep. 25, 2009; 10 pages.
Notice of Allowance for U.S. Appl. No. 11/557,125; 15 pages; May 27, 2011.
Notice of Acceptance for CA Application No. 2613335 dated Apr. 4, 2011; 1 page.
JP Office Action for Application No. 2008-520391; Feb. 1, 2011; 7 pages total with English Translation.
Notice of Acceptance for AU Application No. 2006269413 dated Feb. 7, 2011; 3 pages.
JP Office Action for Application No. 2008-520389; Jan. 18, 2011; 6 pages total with English Translation.
U.S. PTO Office Action for U.S. Appl. No. 12/197,809; May 25, 2011; 35 pages.
Notice of Acceptance for AU Application No. 2006269418 dated Apr. 8, 2010; 3 pages.
JP Office Action for Application No. 2008-520420; Aug. 17, 2010; 11 pages total with English Translation.
Notice of Panel Decision for U.S. Appl. No. 11/210,482; 2 pages; Oct. 2, 2009.
JP Office Action for Application No. 2008-520395; Feb. 1, 2011; 4 pages total with English Translation.
Notice of Allowance for U.S. Appl. No. 11/559,484; 8 pages; Nov. 23, 2010.
Notice of Allowance for U.S. Appl. No. 11/418,939; 27 pages; Mar. 9, 2009.
USPTO Office Action for U.S. Appl. No. 11/553,130, Feb. 18, 2011 (48 pages).
AU Examination Report for Application No. 2010214792 dated May 18, 2011; 2 pages.
EP Office Action for Application No. 07760844.6 dated Jan. 5, 2009; 7 pages.
Notice of Acceptance for Application No. 2010214792 dated Aug. 3, 2011; 3 pages.
Notice of Allowance for U.S. Appl. No. 12/367,566; 12 pages; Aug. 22, 2011.
U.S. PTO Office Action for U.S. Appl. No. 11/063,311; 11 pages; May 12, 2011.
U.S. PTO Office Action for U.S. Appl. No. 11/683,476; 6 pages; Jun. 30, 2011.
U.S. PTO Office Action for U.S. Appl. No. 12/324,221 ; 13 pages; Aug. 10, 2011.
U.S. PTO Office Action for U.S. Appl. No. 12/324,269; 14 pages; Aug. 15, 2011.
U.S. PTO Office Action for U.S. Appl. No. 12/324,355; 14 pages; Aug. 18, 2011.
Notice of Allowance for U.S. Appl. No. 11/559,484; 8 pages; Jun. 20, 2011.
Examiners second Report for AU Application No. 2010212329; 2 pages; Aug. 16, 2011.
Examination Report for AU Application No. 2010212329; 2 pages; May 6, 2011.
Examination Report for AU Application No. 2010202517; 2 pages; Jun. 23, 2011.
AU Examination Report for AU Application No. 2008201005; 4 pages; Mar. 21, 2011.
GB Office Action for Application No. GB0910202.1; 4 pages; Jul. 11, 2011.
Notice of Allowance for CA Application No. 2613333; 1 pages; Jul. 20, 2011.
Notice of Acceptance for AU Application No. 2006269268 dated Jun. 2, 2011; 3 pages.
JP Office Action for Application No. 2008-520393; Aug. 16, 2011; 16 pages total with English Translation.
Chinese Office Action for Application No. 200580009075.5; Aug. 3, 2011; 8 pages.
U.S. PTO Office Action for U.S. Appl. No. 11/839,412; 24 pages; Sep. 7, 2011.
Notice of Allowance for U.S. Appl. No. 10/835,995; 11 pages; Sep. 2, 2011.
Notice of Acceptance of AU Application No. 20100212329; 3 pages; Jul. 27, 2011.
U.S. PTO Office Action for U.S. Appl. No. 10/897,822; 14 pages; Sep. 28, 2010.
U.S. PTO Office Action for U.S. Appl. No. 10/897,822; 15 pages; Jan. 12, 2011.
Notice of Allowance for U.S. Appl. No. 10/897,822; 7 pages; Jun. 7, 2011.
U.S. PTO Office Action for U.S. Appl. No. 10/395,963; 25 pages; Jun. 29, 2011.
Notice of Allowance dated Sep. 20, 2010 for U.S. Appl. No. 10/395,988 ; 4 pages.
Canadian Examination Report for CA Application No. 2613338; 4 pages; Aug. 16, 2011.
U.S. PTO Office Action for U.S. Appl. No. 11/839,425; Sep. 26, 2011; 10 pages.
Notice of Allowance for U.S. Appl. No. 11/557,125; Nov. 16, 2011; 10 pages.
Notice of Allowance for U.S. Appl. No. 11/839,404; Nov. 3, 2011; 56 pages.
U.S. PTO Office Action for U.S. Appl. No. 11/839,418; 28 pages; Nov. 9, 2011.
U.S. PTO Office Action for U.S. Appl. No. 11/681,443; 13 pages; Nov. 28, 2011.
Notice of Allowance for U.S. Appl. No. 12/324,221; 7 pages; Dec. 28, 2011.
Notice of Allowance for U.S. Appl. No. 12/324,269; 7 pages; Dec. 6, 2011.
Notice of Allowance for U.S. Appl. No. 12/324,355; 7 pages; Dec. 12, 2011.
AU Examination Report for Application No. 2011202267; 2 pages; Nov. 30, 2011.
AU Examination Report for Application No. 2011224094; 5 pages; Nov. 25, 2011.
EP Office Action for Application No. 06786672.3 dated Nov. 22, 2011; 7 pages.
EP Office Action for Application No. 06774541.4 dated Nov. 22, 2011; 6 pages.
U.S. PTO Office Action for U.S. Appl. No. 11/553,142; Nov. 8, 2011; 105 pages.
U.S. PTO Office Action for U.S. Appl. No. 11/553,130; 14 pages; Sep. 26, 2011.
Notice of Allowance for U.S. Appl. No. 11/559,484; 8 pages; Dec. 13, 2011.
Notice of Allowance for U.S. Appl. No. 11/839,418; Jan. 27, 2012; 8 pages.
Notice of Allowance for U.S. Appl. No. 12/247,623; Jan. 24, 2012; 8 pages.
Examination Report for CA Application No. 2557209 dated Jan. 20, 2012; 6 pages.
Examination Report for CA Application No. 2598041 dated Jan. 27, 2012; 6 pages.
U.S. PTO Office Action for U.S. Appl. No. 12/647,887; Jan. 23, 2012; 11 pages.
Notice of Panel Decision for U.S. Appl. No. 11/683,476; 2 pages; Jan. 13, 2012.
U.S. PTO Office Action for U.S. Appl. No. 12/197,809; Feb. 10, 2012; 19 pages.
Notice of Allowance for U.S. Appl. No. 11/559,829; Jan. 10, 2012; 14 pages.
U.S. PTO Office Action for U.S. Appl. No. 12/792,361 ; Feb. 13, 2012; 14 pages.
U.S. PTO Office Action for U.S. Appl. No. 11/063,311; 8 pages; Jan. 13, 2012.
Canadian Office Action for CA Application No. 2613084; Feb. 16, 2012; 3 pages.
Extended EP Search report for Application No. 07871467.2; Feb. 8, 2012; 8 pages.

(56) References Cited

OTHER PUBLICATIONS

U.S. PTO Office Action for U.S. Appl. No. 12/685,381 ; 8 pages; Feb. 28, 2012.
U.S. PTO Office Action for U.S. Appl. No. 11/559,933; 23 pages; Mar. 2, 2012.
JP Office Action for Application No. 2007-500972; Jan. 24, 2012; 4 pages (includes English Translation).
Notice of Allowance for U.S. Appl. No. 11/839,404; Mar. 5, 2012; 9 pages.
Notice of Allowance for U.S. Appl. No. 11/839,418; Mar. 14, 2012; 9 pages.
JP Office Action for Application No. 2008-520389; Jan. 24, 2012; 5 pages (includes English Translation).
AU Examination Report for AU Application No. 2007319235; Mar. 13, 2012; 2 pages.
AU Examination Report for AU Application No. 2008201005; Mar. 21, 2011; 4 pages.
JP Office Action for Application No. 2008-520391; Apr. 10, 2012; 6 pages total with English Translation.
Notice of Panel Decision for U.S. Appl. No. 11/839,425; Mar. 28, 2012; 2 pages.
Notice of Acceptance for AU Application No. 2011202267; 3 pages; Mar. 6, 2012.
Notice of Allowance for U.S. Appl. No. 12/324,269; 9 pages; Mar. 22, 2012.
US PTO Office Action for U.S. Appl. No. 11/683,508; Apr. 13, 2012; 9 pages.
Notice of Allowance for U.S. Appl. No. 11/559,484; 17 pages; Jun. 1, 2012.
Notice of Allowance for U.S. Appl. No. 11/559,829; May 11, 2012; 10 pages.
AU Examination report for Application No. 2011244922; Jun. 12, 2012; 2 pages.
AU Examination report for Application No. 2011203051; May 28, 2012; 4 pages.
CA Examination Report for Application No. 2754756; 6 pages; May 29, 2012.
EP Office Action for Application No. 06786486.8; 5 pages; May 14, 2012;.
EP Office Action for Application No. 06786483.5; 7 pages; May 14, 2012;.
AU Examination Report for Application No. 2011235990; 2 pages; May 23, 2012.
JP Office Action for Application No. 2008-520395; Apr. 10, 2012; 4 pages (includes English Translation).
Notice of Allowance for U.S. Appl. No. 12/324,355; 10 pages; Jun. 15, 2012.
Notice of Panel Decision for U.S. Appl. No. 11/553,130; 2 pages; Apr. 25, 2012.
Notice of Allowance for U.S. Appl. No. 11/553,142; Jun. 12, 2012; 8 pages.
AU Examination Report for Application No. 2011202178; May 28, 2012; 2 pages.
Notice of Allowance for U.S. Appl. No. 11/839,418; Jul. 2, 2012; 10 pages.
U.S. PTO Office Action for U.S. Appl. No. 12/647,887; Aug. 3, 2012; 9 Pages.
JP Office Action for Application No. 2011-12803; Jun. 12, 2012; 36 pages total with English Translation.
NZ Examination Report for NZ Application No. 577177; Jun. 29, 2012; 2 pages.
JP Office Action for Application No. 2008-520393; Jul. 3, 2012; 4 pages total with English Translation.
U.S. PTO Office Action for U.S. Appl. No. 11/681,443; 14pages; Jul. 11, 2012.
Notice of Allowance for U.S. Appl. No. 11/685,997; Jul. 10, 2012; 10 pages.
Notice of Allowance for U.S. Appl. No. 12/685,381; 7 pages; Sep. 12, 2012.
Supplemental Notice of Allowance for U.S. Appl. No. 11/685,997; Sep. 7, 2012; 10 pages.
U.S. PTO Office Action for U.S. Appl. No. 12/792,361 ; Sep. 26, 2012; 14 pages.
US Office Action for U.S. Appl. No. 13/561,279; Oct. 11, 2012; 11 pages.
US Office Action for U.S. Appl. No. 13/561,299; Oct. 10, 2012; 11 pages.
AU Examiners Report for Application No. 2005216239 dated Nov. 18, 2009; 2 pages.
Chinese Office Action for Application No. 200580009075.5; Jun. 5, 2012; 9 pages.
European Extended Search Report for Application No. 05723674.7; Dec. 7, 2011; 6 pages.
U.S. PTO Office Action for U.S. Appl. No. 11/839,412; 17 pages; Oct. 19, 2012.
AU Notice of Acceptance for AU Application No. 2006216723; Our ref: 04-7136W0AU; 3 pages; Mar. 20, 2012.
European Extended Search Report for Application No. 06735821.8; Dec. 7, 2011; 9 pages.
Office Action for Japanese Patent Application No. 2010-186542 ; May 22, 2012; 6 pages.
U.S. PTO Office Action for U.S. Appl. No. 13/616,356; 8 pages; Dec. 4, 2012.
U.S. Notice of Allowance for U.S. Appl. No. 12/197,809; Nov. 15, 2012; 15 pages.
Examination Report for AU Application No. 2010202517; 2 pages; Aug. 16, 2011.
European Extended Search Report for Application No. 06786488.4; May 14, 2012; 6 pages.
Notice of Acceptance for AU Application No. 2010212278 dated Nov. 20, 2012; 3 pages.
Extended EP Search report for Application No. 06774581.0; Nov. 22, 2011; 7 pages.
JP Office Action for Application No. 2008-520419; Jun. 12, 2012; 36 pages total with English Translation.
U.S. PTO Office Action for U.S. Appl. No. 11/210,482; 54 pages; Dec. 6, 2012.
CA Examination report for CA Application No. 2596474; Mar. 20, 2012; 1 page.
Notice of Allowance for U.S. Appl. No. 11/559,484; 17 pages; Oct. 12, 2012.
U.S. PTO Final Office Action for U.S. Appl. No. 11/559,933; 24 pages; Dec. 6, 2012.
AU Examination Report for AU Application No. 2007319235; Apr. 16, 2012; 2 pages.
Yampolskiy et al., 2006, "Use of Behavioral Biometrics in Intrusion detection and Online Gaming", Biometric technology for Human Identification III, edited by Patrick J. Flynn, Sharath Pankanti, Proc. of SPIE vol. 6202.
NZ Examination Report for NZApplication No. 577177; Oct. 12, 2012; 2 pages.
NZ Examination Report and Notice of Acceptance for NZ Application No. 577177; Nov. 6, 2012; 2 pages.
NZ Examination Report for NZ Application No. 600525; Jun. 14, 2012; 2 pages.
Notice of Allowance for U.S. Appl. No. 11/559,829; Oct. 9, 2012; 9 pages.
AU Examination Report for Application No. 2011202178; Sep. 4, 2012; 3 pages.
US PTO Notice of Allowance for U.S. Appl. No. 11/683,508; Oct. 25, 2012; 16 pages.
Notice of Allowance for U.S. Appl. No. 12/685,381; Jan. 9, 2013; 16 pages.
Notice of Allowance for U.S. Appl. No. 12/324,269; 27 pages; Oct. 17, 2012.
Notice of Allowance for U.S. Appl. No. 12/324,355; 34 pages; Jan. 16, 2013.
Notice of Allowance for U.S. Appl. No. 113/586,142; 8 pages; Dec. 24, 2012.
US PTO Office Action for U.S. Appl. No. 13/615,440; 17 pages; Jan. 15, 2013.

(56) References Cited

OTHER PUBLICATIONS

US PTO Office Action for U.S. Appl. No. 11/839,425; 11 pages; Jan. 24, 2013.
Office Action for Japanese Patent Application No. 2010-186542 ; Jan. 8, 2013; 5 pages.
US PTO Office Action for U.S. Appl. No. 13/346,133; 24 pages; Oct. 10, 2012.
US Office Action for U.S. Appl. No. 13/561,335; Dec. 28, 2012; 10 pages.
US Office Action for U.S. Appl. No. 13/616,268; Dec. 20, 2012; 7 pages.
European Communication for Application No. 05723674.7; Sep. 12, 2012; 5 pages.
Notice of Allowance for U.S. Appl. No. 11/557,125; 31 pages; Jan. 2, 2013.
U.S. PTO Office Action for U.S. Appl. No. 13/180,065; 9 pages; Oct. 10, 2012.
AU Examination Report for Application No. 2011235990; 3 pages; Aug. 2, 2012.
Notice of Allowance for U.S. Appl. No. 12/647,887; 35 pages; Mar. 13, 2013.
Notice of Allowance for U.S. Appl. No. 12/194,809; 27 pages; Mar. 6, 2013.
AU Notice of Acceptance for AU Application No. 2010202517; 2 pages; Mar. 18, 2013.
EP Communication for Application No. 06774581.0; Feb. 15, 2013; 5 pages.
EP Office Action for Application No. 06774541.4 dated Feb. 15, 2013; 5 pages.
JP Office Action for Application No. 2009-506743 dated Jan. 22, 2013; 5 pages.
JP Office Action for Application No. 2009-537329 dated Feb. 26, 2013; 13 pages.
EP Communication for Application No. 06735821.8 dated Jan. 17, 2013; 5 pages.
Notice of Allowance for U.S. Appl. No. 11/559,484; 11 pages; Mar. 26, 2013.
Notice of Allowance for U.S. Appl. No. 11/063,311, 8 pages; Apr. 8, 2013.
U.S. Office Action for U.S. Appl. No. 13/561,274; 13 pages; May 10, 2013.
JP Office Action for Application No. 2008-520389; Apr. 9, 2013; 5 pages (includes English Translation).
JP Decision on Appeal for Application No. 2008-520419; Apr. 2, 2013; 30 pages [includes English Translation].
Notice of Allowance for U.S. Appl. No. 11/559,829; Apr. 25, 2013; 13 pages.
JP Office Action for Application No. 2008-051097; Mar. 19, 2013; 6 pages [includes English Translation].
USPTO Notice of Allowance for U.S. Appl. No. 13/070,893, 8 pages; Feb. 25, 2013.
U.S. Office Action for U.S. Appl. No. 13/070,893; 13 pages; Apr. 30, 2012.
U.S. Office Action for U.S. Appl. No. 13/080,098; 14 pages; May 25, 2012.
Notice of Allowance for U.S. Appl. No. 11/063,311, 6 pages; May 23, 2013.
Australian Examination Report for AU Application No. 2011250750, 3 pages; May 22, 2013.
EP Communication for Application No. 07871467.2; Feb. 22, 2013; 7 pages.
US PTO Notice of Allowance for U.S. Appl. No. 11/683,508; May 30, 2013; 18 pages.
PCT International Search Report and Written Opinion for International Application No. PCT/US2011/047588; 13 pages; Jan. 13, 2012.
PCT Preliminary Report on Patentability for International Application No. PCT/US2011/047588; 13 pages; Feb. 28, 2013.
U.S. Final Office Action for U.S. Appl. No. 13/561,299; 13 pages; Jun. 7, 2013.
CN Notice of Reexamination for Application No. 200580009075.5; 6 pages; May 24, 2013 (w/ English translation).
U.S. Final Office Action for U.S. Appl. No. 11/839,412; 18 pages; Jun. 6, 2013.
JP Decision to Grant a Patent for Application No. 2008-520391, 4 pages; Jun. 12, 2013; (w/ English translation).
U.S. Notice of Allowance for U.S. Appl. No. 12/647,887; 9 pages; Jun. 7, 2013.
Solutions for Restaurants, Hotels & Resorts and Clubs- Guest bridge, Inc. (online). Guestbridge, Inc. Feb. 6, 2007 [retrieved on Aug. 21, 2008]. Retrieved from the Internet: <URL:http://web.archive.org/web/20070206134139/www.guestbridge.com/solutions.html, entire document especially p. 1.
*Notification of Transmittal of the International Search Report and the Written Opinion of the International Searching Authority, or the Declaration* for International Application No. PCT/US08/56120, 14 pages, 8/29/8.
U.S. PTO Office Action for Patent U.S. Appl. No. 11/256,568 (our ref: May 7178); 17 pages; Oct. 21, 2008.
Office Action for U.S. Pending Patent U.S. Appl. No. 11/063,311 entitled System and Method for Convenience Gaming by Lee M. Amaitis, et al.; Jul. 10, 2008.
*United States Patent and Trademark Office: Office Action* for U.S. Appl. No. 11/199,835, filed Aug. 9, 2005; in the name of Lee M. Amaitis, 17 pages; Mar. 2, 2007.
Hiroshi Kakii, Complete illustration for understanding the latest i-mode, Gijutsu-Hyohron Co. Ltd., Sep. 29, 2000. Second Print of the first edition, p. 36-37, 48-49, 62-63, 78-83, 94-95, and 108-111 (w/ English translation).
Hiroshi Kakii, Complete illustration for understanding the latest i-mode, Gijutsu-Hyohron Co. Ltd., Sep. 29, 2000. Second Print of the first edition, p. 36-37, 48-49, 62-63, 78-83, 94-95, and 108-111.
U.S. Office Action for U.S. Appl. No. 13/561,299; 15 pages; Jun. 19, 2013.
US Office Action for U.S. Appl. No. 13/561,335; Jun. 21, 2013; 13 pages.
European Extended Search Report for Application No. 06735821.8; Jan. 17, 2013; 5 pages.
US Office Action for U.S. Appl. No. 13/657,221; Jul. 9, 2013; 19 pages.
US Office Action for U.S. Appl. No. 11/559,933; Jul. 15, 2013; 32 pages.
US Office Action for U.S. Appl. No. 13/616,535; Jul. 9, 2013; 11 pages.
US Office Action for U.S. Appl. No. 11/683,476; Jul. 9, 2013; 5 pages.
US Notice of Allowance for U.S. Appl. No. 12/324,221; Sep. 20, 2013; 8 pages.
JP Decision on Appeal for Application No. 2005-520393; Sep. 10, 2013; 45 pages (w/English translation).
AU Examination Report No. 1 for Application No. 2012201974; Oct. 21, 2013; 3 pages.
U.S. Final Office Action for U.S. Appl. No. 13/346,133; 13 pages; Aug. 12, 2013.
U.S. Final Office Action for U.S. Appl. No. 13/616,268; 13; pages; Aug. 15, 2013.
U.S. Final Office Action for U.S. Appl. No. 11/839,425; 11; pages; Aug. 15, 2013.
U.S. PTO Office Action for U.S. Appl. No. 13/180,065; 13 pages; Aug. 2, 2013.
Notice of Allowance for U.S. Appl. No. 12/247,623; Aug. 2, 2013; 6 pages.
US Office Action for U.S. Appl. No. 13/616,356; Aug. 15, 2013; 11 pages.
Notice of Allowance for U.S. Appl. No. 11/559,829; Aug. 23, 2013; 10 pages.
US Office Action for U.S. Appl. No. 13/616,588; Aug. 20, 2013; 17 pages.
Australian Examination Report for AU Application No. 2012203722, 2 pages; Aug. 23, 2013.
US Notice of Allowance for U.S. Appl. No. 11/063,311; Sep. 10, 2013; 7 pages.

(56) References Cited

OTHER PUBLICATIONS

Notice of Allowance for U.S. Appl. No. 11/559,829; Sep. 12, 2013; 10 pages.
U.S. Final Office Action for U.S. Appl. No. 13/615,440; 10; pages; Sep. 9, 2013.
US Office Action for U.S. Appl. No. 13/615,981; Sep. 13, 2013; 12 pages.
US Office Action for U.S. Appl. No. 13/616,492; Sep. 13, 2013; 13 pages.
CA Examiner's Requisition for Application No. 2,613,362; Sep. 16, 2013; 3 pages.
JP Final Decision for Appeal No. 2012-9549; Sep. 10, 2013; 26 Pages (w/English translation).
U.S. Office Action for U.S. Appl. No. 11/210,482; Oct. 1, 2013; 16 pages.
U.S. Notice of Allowance for U.S. Appl. No. 12/647,887; 6 pages; Jul. 19, 2013.
JP Office Action for Application No. 2008-520395; Jun. 11, 2013; 8 pages.
U.S. Final Office Action for U.S. Appl. No. 13/080,098; 15 pages; Jul. 22, 2013.

SYSTEM AND METHOD FOR PROVIDING WIRELESS GAMING AS A SERVICE APPLICATION

CROSS REFERENCE TO RELATED APPLICATION

This patent application is a continuation application of: U.S. patent application Ser. No. 11/199,964 filed Aug. 9, 2005 now U.S Pat. No. 8,070,604 which is hereby incorporated by reference herein in its entirety.

TECHNICAL FIELD

The present invention relates generally to the field of gaming and, more particularly to a gaming system and method incorporating a wireless network.

BACKGROUND

The gaming industry allows people to participate in a variety of gaming activities within the limits of state and federal law. Possible gaming activities include gambling, such as that provided by casinos. Casino-type gambling activities include, but are not limited to, slot machines, table games, poker, keno, and other gaming activities that allow for the placement of bets. Events also may be wagered on and may include, for example, sporting events, such as horse or auto racing, and athletic competitions such as football, basketball, baseball, boxing, and golf. Gaming can also include non-wagering games and events, such as lottery contests. In a casino environment, the participation in such gaming activities is generally limited by a participant's physical location. For example, participants in casino-type gambling activities must be present at a gaming machine or at a gaming table within the casino in order to place a bet. Similarly, people interested in wagering on sporting events or athletic competitions in a casino environment must place bets through a sports book that is located in the casino.

SUMMARY

Various embodiments of the invention are directed to gaming systems, which may be wireless gaming systems. According to certain embodiments, the gaming system is operable to make various gaming activities available to one or more users over a communications network and to display information associated with the activities to the users on gaming devices. The gaming devices may be mobile communication devices. Gaming activities may include any activities referred to or contemplated herein and are not limited to games. Gaming activities can include, for example, games, gambling activities, sporting events, purchase of goods or services, and accessing concierge services.

In accordance with an example embodiment, a communication system, includes at least one processor operable to provide a gaming service to a gaming device in electronic communication with the processor. The gaming device is associated with a communication account, and the gaming service is provided to the gaming device according to at least one customizable-parameter associated with the communication account.

In accordance with an example embodiment, a gaming system includes a database that electronically stores at least one gaming application. The gaming application is configured to be overlaid on an existing communication network and is operable to be distributed to a gaming device in electronic communication with the communication network in accordance with at least one customizable-parameter.

In accordance with another example embodiment, a method for providing wireless gaming as a service application is included. The method includes steps. One step may include using a pre-existing communications network to provide a communications service to at least one customer. A second step may include applying at least one customizable-parameter to a gaming service. A third step may include providing the gaming service to the at least one customer on the pre-existing communication network according to the least one customizable-parameter.

In accordance with another example embodiment, a method is provided for providing wireless gaming as a service application is included. The method includes steps. One step may include using a pre-existing communications network to provide a communications service to at least one customer. A second step may include maintaining a communications account associated with the at least one customer. A third step may include offering a gaming service to be provided, to the at least one customer, on the pre-existing communications network in accordance with at least one customizable-parameter.

In accordance with another example embodiment, software provides wireless gaming as a service application. The software operates to use a pre-existing communications network to provide a communications service to at least one customer, apply at least one customizable-parameter to a gaming service to create a customized gaming service, and provide the customized gaming service to the at least one customer on the pre-existing communication network according to the least one customizable-parameter.

In accordance with another example embodiment, software provides wireless gaming as a service application. The software operates to use a pre-existing communications network to provide a communications service to at least one customer and maintain a communications account associated with the at least one customer. The software also operates to offer a gaming service that is provided, to the at least one customer, on the pre-existing communications network in accordance with at least one customizable-parameter.

Various embodiments of the present invention may benefit from numerous advantages. It should be noted that one or more embodiments may benefit from some, none, or all of the advantages discussed below.

One advantage is that the system enables remote, wireless, mobile gaming over a pre-existing communications network. Accordingly, a communications service provider may offer enhanced gaming services to pre-existing customers. Thus, another advantage may be that communication customers may use a single communications device, such as a cell phone or PDA, to make and receive wireless telephone calls and to participate in gaming activities. Still another advantage may be that communications services and gaming services may be billed together.

Another advantage may be that the system allows gaming services to be customized for each gaming customer. For example, customer preferences may be used to identify a customer's gaming interests and gaming applications may be tailored to reflect the customer's interests. As another example, level of service information may be used to identify specific gaming applications to which a customer is authorized to access. Still another advantage may be that the system enables remote, wireless, mobile, gaming, while preventing gaming by unauthorized users and from unauthorized locations.

Other advantages will be readily apparent to one having ordinary skill in the art from the following figures, descriptions, and claims.

BRIEF DESCRIPTION OF THE DRAWINGS

For a more complete understanding of the present invention and for further features and advantages, reference is now made to the following description, taken in conjunction with the accompanying drawings, in which.

DETAILED DESCRIPTION

Figure 1:
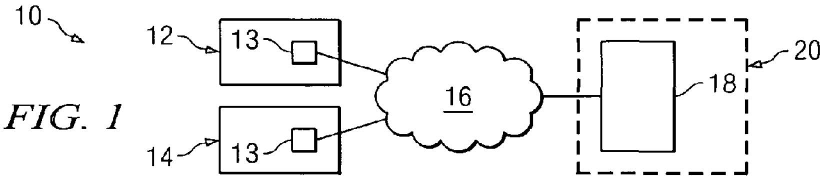
FIG. 1 illustrates a gaming system according to an embodiment of the present invention.

A gaming system enables participants to engage in gaming activities from remote and/or mobile locations. The possible gaming activities include gambling, such as that provided by casinos. Gambling activities may include any casino-type gambling activities including, but not limited to, slot machines, video poker, table games (e.g., craps, roulette, blackjack, pai gow poker, Caribbean stud poker, baccarat, etc), the wheel of fortune game, keno, sports betting, horse racing, dog racing, jai alai, and other gambling activities. The gaming activities can also include wagering on any type of event. Events can include, for example, sporting events, such as horse or auto racing, and athletic competitions such as football, basketball, baseball, boxing, golf, etc. Events can also include such things that do not normally involve wagering. Such events may include, without limitation, political elections, entertainment industry awards, and box office performance of movies. Gaming can also include non-wagering games and events. Gaming can also include lotteries or lottery-type activities such as state and interstate lotteries. These can include all forms of number-selection lotteries, "scratch-off" lotteries, and other lottery contests. The gaming system may be implemented over a communications network such as a cellular network or a private wireless and/or wireline network. Examples of the latter include WiFi and WiMax networks. In one embodiment, the gaming system communications network is entirely independent of the Internet. In another embodiment, the gaming system operation makes minimal use of the Internet, such that only information for which there are no security issues is transmitted via the Internet and/or information may be encrypted. Preferably, the communications network enables players to participate in gaming from remote locations (e.g., outside of the gaming area of a casino). Also, the system may enable players to be mobile during participation in the gaming activities. Preferably, the system has a location verification or determination feature, which is operable to permit or disallow gaming from the remote location depending upon whether or not the location meets one or more criteria. The criterion may be, for example, whether the location is within a pre-defined area in which gaming is permitted by law.

According to certain embodiments, gaming services may be provided as an application add-on to a pre-existing communication or data service. Thus, gaming service applications may be made available to customers of a pre-existing communication or data service. For example, customers of a particular wireless telephone or data service may be offered any one or combination of the various gaming service applications discussed herein as an additional feature that is bundled with the telephone or data service. Although this document may refer to the communication service bundled with offered gaming service applications as including pre-existing communication services, it is recognized that the gaming services applications may be offered and accepted as part of a package with newly-activated communications service plan. In still other embodiments, the gaming service may be established first and the communication service may be added later.

The gaming service applications bundled with, or otherwise offered in conjunction with communication services, may be customized to meet the needs of the customers, service providers, or both. For example, a service provider may elect to make certain gaming service applications available to only a subset of the service providers' customers. Accordingly, not all customers associated with a service provider may be offered gaming services. As an another example of customized gaming service applications, a communication service may offer customers a number of gaming service plans which may provide different levels of service. For example, certain services such as advertisement services and/or promotional services may be free to customers of the communications service. Such levels of service may be customer-selected, service provider-selected, or both.

Customers may be billed separately for add-on gaming services, or in conjunction with the invoice the customer already receives for the pre-existing communications service. For instance, in certain embodiments, gaming services may be billed as an add-on in the same way that Caller ID services, call waiting services, and call messaging services result in fees that are in addition to the basic fees associated with communication services.

As shown in FIG. 1, for example, gaming system 10 includes at least one user 12. The system may include additional users such that there is at least a first user 12 and a second user 14. Multiple users may access a first gaming system 10, while other multiple users access a second gaming system (not shown) in communication with first gaming system 10. Users 12 and 14 preferably access system 10 by way of a gaming communication device 13. Gaming communication device 13 may comprise any suitable device for transmitting and receiving electronic communications. Examples of such devices include, without limitation, mobile phones, personal data assistants (PDAs), computers, mini-computers, etc. Gaming communication devices 13 transmit and receive gaming information to and from communications network 16. Gaming information is also transmitted between network 16 and a computer 18, such as a server, which may reside within the domain of a gaming service provider 20. The location of computer 18 is not critical, however, and computer 18 may reside adjacent to or remote from the domain of gaming service provider 20. Moreover, in certain embodiments, a gaming service provider is not required. The computer 18 and/or gaming service provider 20 may reside within, adjacent to, or remote from a gaming provider (not shown in FIG. 1). The gaming provider may be an actual controller of games, such as a casino. As an example, a gaming service provider may be located on the grounds of a casino and the computer 18 may be physically within the geographic boundaries of the gaming service provider. As discussed, however, other possibilities exist for remote location of the computer 18 and the gaming service provider 20. Computer 18 may function as a gaming server. Additional computers (not expressly shown) may function as database management computers and redundant servers, for example.

Preferably, software resides on both the gaming communication device 13 and the computer 18. Software resident on gaming communication device 13 is preferably operable to present information corresponding to gaming activities (including gambling and non-gambling activities discussed herein) to the user. The information includes, without limitation, graphical representations of objects associated with the activities, and presentation of options related to the activities and selectable by the user. The gaming communication device software is also preferably operable to receive data from the computer and data input by the user. Software resident on the computer is preferably able to exchange data with the gaming communication device, access additional computers and data storage devices, and perform all of the functions described herein as well as functions common to known electronic gaming systems.

Gaming information transmitted across network 16 may include any information, in any format, which is necessary or desirable in the operation of the gaming experience in which the user participates. The information may be transmitted in whole, or in combination, in any format including digital or analog, text or voice, and according to any known or future transport technologies, which may include, for example, wireline or wireless technologies. Wireless technologies may include, for example, licensed or license-exempt technologies. In particular embodiments, network 16 may include a Land Area Network (LAN), a Wide Area Network (WAN), a Metropolitan Area Network (MAN), a Personal Area Network (PAN), the Internet, an Intranet, an Extranet, or any combination of these or other suitable communication networks. Some specific technologies which may be used include, without limitation, Code Division Multiple Access (CDMA), Time Division Multiple Access (TDMA), Global System for Mobile Communication (GSM), General Packet Radio Service (GPRS), WiFi (802.11x), WiMax (802.16x), Public Switched Telephone Network (PSTN), Digital Subscriber Line (DSL), Integrated Services Digital Network (ISDN), Blue Tooth, or cable modem technologies. These are examples only and one of ordinary skill will understand that other types of communication techniques are within the scope of the present invention. Further, it will be understood that additional components may be used in the communication of information between the users and the gaming server. Such additional components may include, without limitation, lines, trunks, antennas, switches, cables, transmitters, receivers, computers, routers, servers, fiber optical transmission equipment, repeaters, amplifiers, etc.

In at least one embodiment, the communication of gaming information takes place without involvement of the Internet. However, in certain embodiments, a portion of the gaming information may be transmitted over the Internet. Also, some or all of the gaming information may be transmitted partially over an Internet communications path. In certain embodiments, some information is transmitted entirely or partially over the Internet, but the information is either not gaming information or is gaming information that does not need to be maintained secretly. For instance, data that causes a graphical representation of a table game on the user's gaming communication device might be transmitted at least partially over the Internet, while wagering information transmitted by the user might be transmitted entirely over a non-Internet communications network.

Figure 9:
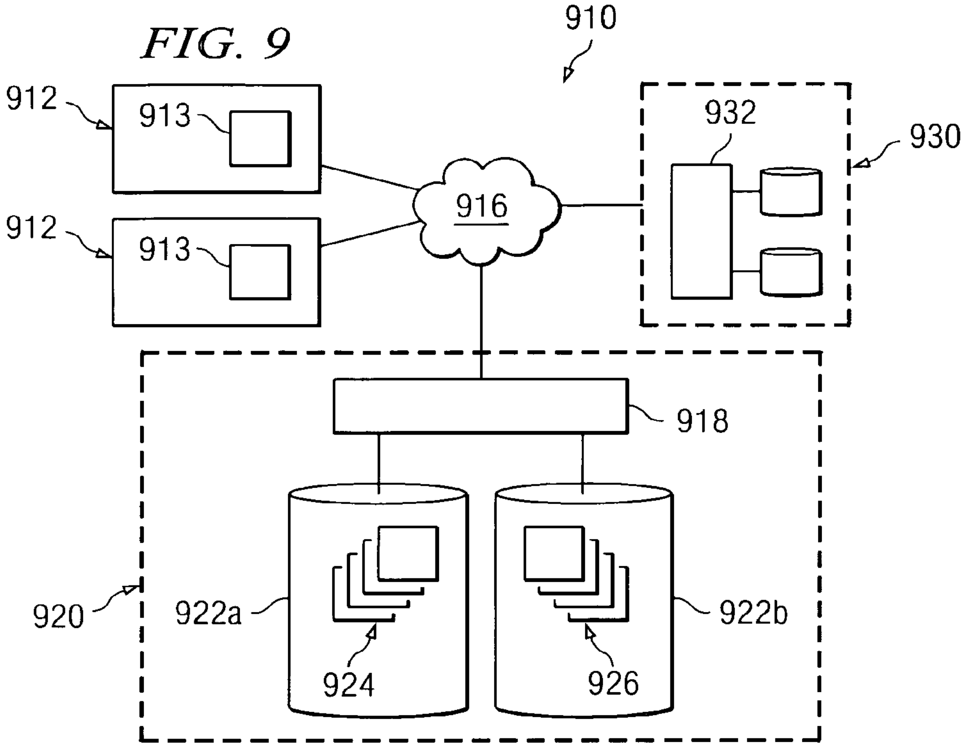
FIG. 9 illustrates a wireless gaming system offered as a service application in accordance with an embodiment of the present invention.
Figure 10:
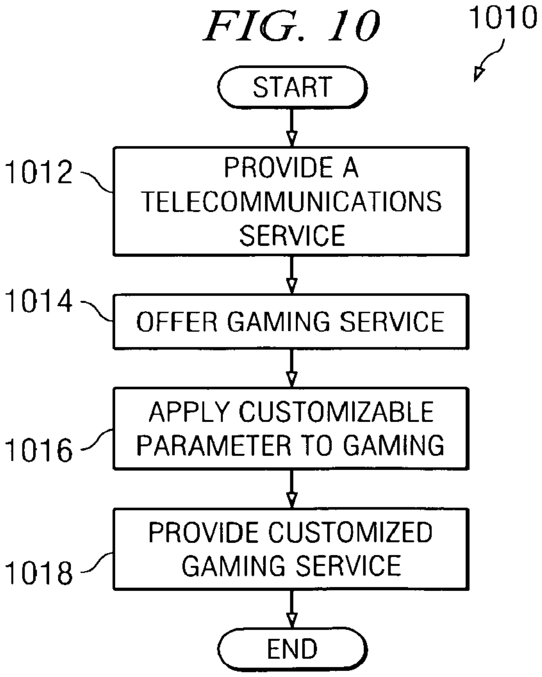
FIG. 10 illustrates a method for providing wireless gaming as a service application in accordance with an embodiment of the present invention.

As described above, gaming services may be offered as service applications on pre-existing communication networks. Example systems and methods for providing gaming services as applications on a pre-existing communication network are illustrated in FIGS. 9 and 10, for example. As shown in FIG. 9, certain embodiments of the gaming system may include software and hardware to enable the offering of wireless gaming as service applications on pre-existing communication networks. As will be described in more detail below, the gaming service applications are offered according to at least one-customizable parameter that may be set by a gaming participant, the gaming service provider, or applicable federal or state law. In particular, a gaming system 910 includes at least one user 912. Users 912 preferably access system 910 by way of gaming communication devices 913, which may be similar to gaming communication devices 13 described above with regard to FIG. 1.

In various embodiments, gaming communication devices 913 transmit and receive gaming information to and from communications network 916. Gaming information is also transmitted between network 916 and a computer 918, such as a server, which may reside within the domain of a gaming service provider 920. As with the description of system 10 in connection with FIG. 1, this is an example illustration only and it will be readily understood that system 910 may be modified in any number of ways within the scope and spirit of the detailed description. For example, the computer 918 may comprise multiple servers, which may be centralized or distributed.

In particular embodiments, gaming service provider 920 offers communication services in addition to the gaming services described herein. Such communication services may include voice and/or data services. For example, gaming service provider 920 may offer wireless telephone or messaging services to one or more customers. Such services may include those similar to the wireless services provided by Sprint, AT&T, Verizon, T-Mobile, SBC, Nextel, and other mobile carriers. Services including cellular telephone, paging, text messaging, and other wireless services may be provided through computer 918 or another computer associated with gaming service provider 918. Although this document may refer to the services provided by gaming service provide 920 as "telecommunication services," it is generally recognized that the "telecommunication services" includes any type of communication or data delivery services, including, but not limited to those communication and data delivery services that may be communicated on CDMA, TDMA, GSM, GPRS, WiFi (802.11x), WiMax (802.16x), PSTN, DSL, ISDN, Blue Tooth, and/or cable modem technologies.

Preferably, system 910 includes at least one database 922. The database(s) 922 may be any suitable database capable of receiving, storing, and/or distributing electronic data. In the illustrated embodiment, system 912 includes a customer profile database **922*a* and a service application database 922*b*. One or more customer profiles 924 are maintained in customer profile database 922***a*. Each customer profile 924 preferably consists of one or more data files. It is generally recognized, however, that customer profiles 924 may be maintained in any form that allows the establishment, maintenance, and or updating of customer profiles 924 via the transfer of electronic information. It should also be understood that customer profile information may be centralized, as shown, or distributed and certain portions of customer profile information may be maintained at different elements within or without system 910.

According to at least one embodiment, a customer profile 924 includes various information corresponding to a user 912 of system 910. Such information may include information such as account information, subscription and service information, billing information, or other appropriate customer-specific information. In particular embodiments, the information may form a customizable parameter that is applied to a gaming service to result in a customized gaming service. The account information associated with a particular customer profile, for example, may include an identifier such as an account number that identifies an account associated with a particular user 912. The account information may also include customer contact information such as a customer's physical address, email address, wire line telephone number, and wireless telephone number. The account information may also include one or more unique identifiers associated with the gaming communication device 913 and/or user 912 that receives telecommunication and gaming services through the particular customer account. For example, the account information may include codes, social security numbers, passwords, user names, login identifications, and biometric information (e.g., retina scan, fingerprint, and voice print information). Although each customer profile 924 may be associated with a single user 912 and/or single communication device 913, it is also recognized the account information may identify multiple users 912 and/or communication devices 913 that are associated with a single account. For example, where the customer profile 924 corresponds with a subscription to a family plan that allows multiple users to receive telecommunication and/or gaming services through a single account, the account information may identify multiple users 912 and/or communication devices 913 associated with a single account.

In particular embodiments, the telecommunication and/or gaming services may be offered to users 912 on a subscription basis. Thus, users 912 may receive telecommunication and/or gaming services for a set periodic fee. For example, users 912 may contract with gaming service provider 920 to receive some combination of telecommunication and/or gaming services on a monthly basis for a monthly fee. In such embodiments, customer profile 924 may include subscription and service information associated with a particular customer and/or customer account. Such subscription and service information may specify the particular telecommunication and/or gaming services that the customer has subscribed to or otherwise authorized to receive. For example, a particular customer profile 924 may specify that John Smith is subscribed to receive wireless telephone, text messaging, and gaming services. When John Smith uses a gaming device 913 to receive such services through communications network 916, computer 918 may use identity verification processes to associate customer profile 924 with John Smith and identify any subscription information in customer profile 924. Subscription information may then be used by computer 918 to authorize the provision of such services to John Smith through gaming device 913 and, thus, may include a customizable-parameter that is applied to offered gaming services.

Certain services provided by service provider 920 may be considered basic services while others are considered "add-on" or enhanced services. A basic service provided by service provider 920 may include any service that forms a core or pre-existing service of service provider 920. For example, if a particular service provider 920 is Sprint PCS, Verizon, T-Mobile, or another wireless telephone provider, the basic service provided by the service provider 920 may be wireless telephone service. In particular embodiments, all customers of service provider 920 may receive the basic service offering of wireless telephone service in some form. Accordingly, subscribers or customers of a wireless telephone service provider may, at a minimum, receive wireless telephone service from service provider 920.

Services that are additional to and/customizable by a user 912 of gaming device 913 may be considered add-on services. For example, if wireless telephone services comprise the basic service offered by service provider 920, add-on services may include telephone enhancement services (call waiting, caller ID, call-waiting ID, etc.), voice messaging services, text messaging services, photo sharing services, video sharing services, customizable downloads (screen savers, ring tones, etc.), gaming services, device insurance, and any other services collaterally offered by service provider 920.

Add-on services may be offered by service provider 920 on a subscription basis, on a per-use basis, or on a pre-paid basis. For example, in particular embodiments, add-on services may be subscribed to in the same manner that basic services are subscribed to. Thus, a user 912 of the basic wireless telephone services offered by service provider 920 may subscribe to receive gaming services on a monthly basis for an additional fee. For example, a pre-existing wireless telephone customer may subscribe to receive gaming services for an additional fee of five dollars per month. In other embodiments, a fee may be incurred each time a user 912 access the add-on service. Accordingly, a user 912 may be charged a fee of twenty-five cents each time the user 912 access gaming services from the user's wireless telephone or PDA.

In certain embodiments, service applications may be bundled by service provider 920 and provided to a user 912 as a package. For example, service provider 920 may offer 1000 anytime minutes of wireless telephone services for a fee of $35/month. That same service provider 920 may also offer 1000 anytime minutes of wireless telephone services with enhancements such as caller ID and call waiting, unlimited voice messaging, and unlimited access to gaming information for a fee of $40/month. Because a customer may feel that he is getting more for his money, the customer may consider the package with the bundled add-on services to be a better value. Thus, add-on services may be bundled with basic services, in particular embodiments, to improve the marketability of the add-on services.

Add-on services may also be bundled with other add-on services and offered to customers at prices that are cheaper than the price of adding each service individually. For example, assume that add-on services such as caller ID, call waiting, and gaming information may be added individually on an ala cart basis for $5 each. Service provider 920 may offer customers a package of bundled services that includes caller ID, call waiting, and gaming information for $12. A customer who desires all three services will receive a $3 discount by purchasing the bundled package of services. Accordingly, the bundling of a group of add-on services also improves the marketability of the services to users 912.

In particular embodiments, add-on services may be bundled to improve the marketability of less-standard or less-popular add-on services. For example, a wireless telephone customer who only desires caller ID and call waiting may be inclined to purchase the above-described package that also includes unlimited access to gaming information since the additional feature only costs the customer $2/month. As another example, a customer may be inclined to by a package that includes gaming device insurance even if that customer would not be inclined to buy gaming device insurance if offered ala cart. In this manner, the bundling of add-on services may encourage customers to purchase services that they might not otherwise purchase.

In the above-described examples, wireless telephone is provided by service provider 920 as a basic service and gaming services are provided as an add-on service. It should be noted, however, that such packing of services is described for example purposes only. It should be generally recognized that the converse could also be true. Thus, gaming services may be offered as a basic service and wireless telephone services may be offered as an add-on service. Alternatively, gaming services and telephone services may both be offered as basic services or may both be offered as add-on services. In still other embodiments, there may be no distinguishment between the basic and add-on services. Regardless of the type of packaging or bundling of services offered by service provider 920, it is generally recognized that subscription information included in customer profiles 924 may identify the types of services a user 912 is authorized to access and any limitations upon those services.

In certain embodiments, customer profiles 924 also includes billing information that may be used to periodically bill a user 912 for the receipt of telecommunication and/or gaming services. Such billing information may include a billing address to which bills may be sent. Alternatively or additionally, billing information may identify one or more accounts that may be used to automatically pay for services. For example, billing information may identify an account from which an automatic withdrawal is made each month to pay for wireless telephone services. Such an account or another account may also be identified for use in funding gaming activities.

Billing information may also include summarizations of services used during a billing period. The summarizations may be used to calculate fees due for any services that incur charges on a per-use basis. For example, if user 912 subscribes to gaming services and incurs a charge of $1 for each gaming transaction, a summarization of the user's gaming activity during a billing period would be used to calculate fees due by user 912 for gaming services used. Summarizations of service activity may also be used to calculate overage charges where a user's activity during the billing period exceeds that which the user 912 is authorized. For example, if a user 912 is authorized to access gaming information on twelve occasions during a month for a set fee, but that user's activity indicates that the user 912 accessed gaming information on fifteen occasions, computer 918 may use billing information and subscription information in customer profile 924 to calculate an overage charge to billed to user 912. In the above described example, the user 912 would be billed an additional overage charge for the three additional uses of gaming information.

Although customer profiles 924 are described above as including billing information, customer information, and account information, it is generally recognized that in certain embodiments customer profiles 924 may include less or more information. For example, where telecommunication and gaming services are offered on a pre-paid basis, customer profiles 924 may include information limited to identifying communication device 913 to service provider 920 and accounting for services used. In such embodiments, customer information is rarely known or tracked and billing information is generally not maintained.

As another example, it is also recognized that certain embodiments may include customer preference information stored in customer profiles 924. As will be described in more detail below, the preference information may include information that is indicative of a user's preferences with respect to at least one aspect of the telecommunications or gaming services offered to the user 912. For example, preference information may include information associated with preferred screen or display configurations, ring tones, phone books. Additionally or alternatively, preference information may identify customer interests. For example, a customer may set his preferences to indicate an interest in a particular sport, a particular sporting event, a particular table game, or another gaming activity.

As described above, gaming system 910 also includes a service application database **922*b*. Service database 922*b* may include a library of service applications 926 offered to users 912 and any service-specific information associated with service applications 926. Example service applications include wireless telephone applications, gaming applications, electronic mail applications, or any other communication application provided to users 912 by service provider 920. In particular embodiments, service applications 926 may be downloaded to and stored in communication devices 913. Alternatively, service applications 926 may be stored centrally by service provider 920 and accessed by devices 913** on a per-use basis.

In certain embodiments, service applications 926 include gaming applications that allow users 912 of devices 913 to receive gaming services. Such gaming services may enable a user 912 to receive or access gaming or sporting information or participate in gaming activities. For example, and as will be described in more detail below, a gaming application 926 may enable user 912 of device 913 to receive real-time gaming or sporting information in accordance with user preferences. Another gaming application 926 may enable user 912 to place bets or perform other gaming transactions in accordance with user preferences and applicable laws.

In particular embodiments, gaming service applications 926 may be made available to all existing customers of service provider 920. Thus, customers receiving telecommunication services such as cellular service may be offered access to all gaming service applications 926 offered by service provider 920. In other embodiments, some or all gaming service applications 926 may be made available to only a subset of customers of service provider 920. The determination of the subset may be made on any number of criteria including, without limitation, residence, age, creditworthiness of the customer and applicable state or federal laws. For example, gaming service applications 926 that allow customers to place bets or otherwise actively participate in gaming may be made available only to those customers living in or located in a state that allows such gaming activity. Customers residing in states that do not permit such activity may not be offered gaming services in certain embodiments. As another example, such gaming applications 926 may only be offered to customers over the age of eighteen where required by law. Accordingly, in the manners described, the availability of gaming applications may vary depending upon applicable state and federal law.

In particular embodiments, a customer subscribing to or otherwise electing to receive gaming applications 926 may set customer preferences with regard to those gaming applications 926. As described above, such information may be stored in customer profiles 924 and may be used by computer 918 to determine the particular gaming services that are transmitted to the user's communication device 913. Customer preferences may identify the particular types of gaming services that a customer is interested in. As such, a user 912 may be said to "opt" to receive particular gaming service applications 924. For example, when subscribing to receiving gaming services, user 912 may receive an electronically transmitted questionnaire that seeks interest information from user 912. The user's answers to the questionnaire may then be transmitted to computer 918 for storage in the user's associated customer profile 924. Accordingly, when computer 918 gathers or receives information relating to the Kentucky Derby, computer 918 may determine which users 912 have indicated a customer preference to receive information relating to horse racing, generally, or to the Kentucky Derby, specifically. Computer 918 may then disseminate the information to only the communication devices 913 associated with customer profiles 924 and, thus, users 912 that identify an interest in the Kentucky Derby or horse racing, generally. By limiting the dissemination of information to only those users 912 that have explicitly expressed an interest in the subject matter, gaming service provider 920 may reduce communication traffic on network 916.

Gaming applications 926 may also be offered at differing levels of service. In particular embodiments, some levels of service may be automatically provided to customers. For example, certain services such as advertisement and promotional services may be free. Accordingly, if a customer subscribes to wireless telephone services, the customer may receive advertisements and promotions related to the gaming and sporting industries regardless of whether that customer is a "gaming customer." In such an embodiment, the gaming services received are unsolicited by the user 912 receiving the services. In other embodiments, the advertisement and promotional services may be provided only to those customers that have subscribed to receive some sort of gaming service.

Some levels of service may be automatically provided to all customers who do not opt out. For example, a customer who subscribes to or otherwise elects to receive gaming services may receive advertisements and promotions from a broad range of vendors including vendors in industries that are outside of the customer's areas of interest unless that customer opts not to receive such advertisements and promotions. Accordingly, a user 912 who subscribes or otherwise elects to receive gaming information associated with horse racing and Texas Hold'em poker because those are the user's primary interests may also receive promotions and advertisements relating to NCAA tournaments. However, to avoid receiving promotions and advertisements outside of the user's areas of interest, user 912 may be able to opt not to receive advertisements and promotions not relating to horse racing or Texas Hold'em. As described above, a customer's preference to opt out of such gaming services may be stored as a customer preference in customer profile 924 and may be used by computer 918 in the dissemination of "free gaming services."

Additionally or alternatively, users 912 may be given an opportunity to "opt in" to receive customized promotions and advertisements related to the established preferences of users 912 who have subscribed to some sort of gaming service. Accordingly, if a customer subscribes to receive gaming information that is related to horse racing (and, thus, pays for gaming information related to horse racing), the customer may be given an opportunity to opt to receive "free" gaming services such as promotions and advertisements that also relate to horse racing. Where the customer must opt in to receive such "free" services, promotions and advertisements that are not related to horse racing are not distributed to the customer.

In addition to the "free" gaming services discussed above, service provider 920 may offer a variety of gaming service plans which provide varying levels of service. For example, a customer may subscribe to concierge-type services to receive gaming and sports related news. An intermediate level of service may provide concierge-type services on a customized basis. Thus, if a customer is interested in Texas Hold'em poker, the customer may register or otherwise indicate a customer preference for news relating to Hold'em tournaments. If a customer is a horse racing fan, the customer might register or otherwise indicate a customer preference for jockey reports, track conditions, training schedules, or other information relating to horse racing generally or to a particular horse track. Still other levels of service that may be provided by service provider 920 may include service plans that allow a user 912 to actually place bets or otherwise participate in gaming activities. As examples, a service plan may allow a customer to play blackjack or other table games, bet on sporting events, bet on racing events, or participate in some combination in these or other gaming activities.

The fees associated with such service plans may vary depending upon the services associated with the levels of service. Thus, service plans limited to uncustomized concierge-type services may be less expensive than service plans that provide customized concierge-type services or participatory gaming services. For example, customers of service provider 920 may be offered a basic, uncustomized information only service for $5 per month. As described above, a subscriber to such a service might receive news reports and other information relating to any facet of the gaming or sporting industries. As another example, customers of service provider 920 may be offered customized information services for $10 per month. A subscriber to such a service might receive news reports and other information relating only to gaming that correspond with the customer's identified preferences. As still another variation, the fee associated with a customized information service may vary depending the number of customer interested identified in the customer's customer profile 924. Accordingly, a customer subscribing only to receive gaming information related to horse racing may pay less than a customer subscribing to receive all gaming information related to horse racing and Texas Hold'em tournaments. Gaming service plans that allow a customer to actually place bets on horse races and participate in Texas Hold'em tournaments might be more expensive still. And, gaming service plans that allow a customer to build a customized virtual casino might comprise "premium" gaming services that incur higher fees than those gaming service plans that merely allow a customer to play in an established virtual casino. In particular embodiments the gaming services associated with the virtual casino may include services that allow users to select table games, select betting limits, select dealers, select game rules, and/or select the number of players on a table. It is recognized, however, that the gaming activities associated with the virtual casino are not limited to table games. The virtual casino may also allow users to wager bets on sporting events, such as athletic events or horse racing, or even other typically non-wagering types of events, such as political races.

The billing of gaming services provided by gaming service provider 920 may be handled in a variety of ways. In particular embodiments, gaming services and telecommunication services may be billed separately. Accordingly, billing information stored in customer profiles 924 may distinguish between telecommunication services provided to a customer and gaming services provided to a customer. Using such a billing system, a customer of service provider 920 may receive two separate bills associated with two separate accounts. In other embodiments, gaming services and telecommunication services may be billed together. For example, where wireless telephone service is the "basic" service and gaming services are considered an "add-on," the gaming services may be invoiced with telecommunications service. Thus, gaming services may be billed as an add-on in the same way that Caller ID, Call Waiting, and other enhanced telecommunication services are billed. Where billed together, gaming services are provided as an application to sit on or interface with the applications controlling the functionality of the telecommunications service.

Where the gaming services provided to customers allow for the placement of bets of other gaming activities, additional charges may be incurred by a customer participating in these activities. These charges may be additional to the monthly service charges that generally make the service available to the customer. For example, a customer may pay $5 per month for the ability to gamble in a virtual casino. However, when that customer places a bet in the virtual casino, additional charges for the bet and any transaction fees may be incurred. In particular embodiments, a customer may have an established line of credit with service provider 920 and bets may be billed on a periodic basis with monthly service fees. In other embodiments, customer database 922*a* may include account information that identifies other accounts to where such charges should be billed. For example, user 912 may identify a credit card account, savings account, checking account, or other user account from where such additional charges should be withdrawn. In still other embodiments, communication device 913 may directly communicate with a credit card account, savings account, checking account, or other user account while placing gambling bets or participating in other gaming activities. For example, where a user 912 has a line of credit established through an actual casino, device 913 may communicate with the casino house to authorize the placement of bets from the line of credit when user 912 is playing in an associated virtual casino.

Where communication device 913 is enabled to directly communicate with a customer's credit card account, savings account, checking account, or other user account, a "bill-pay" service may be provided as part of or in addition to a gaming service. Accordingly, "bill-pay" services may be accessible to the communication device 913. Such "bill-pay" services may allow a customer to pay collateral bills using the communication device 913. For example, a user 912 may pay utility, credit card, mortgage, or other bills using the same communication device 913 on which the user 912 access gaming services.

As described above, the offering of gaming applications 926 to customers and subsets of customer may be limited by state and federal law. Accordingly, one or more "available" services may be made accessible to a customer based on the customer's location. Stated differently, location information associated with the customer's communication device 913 may also be used to limit the gaming services available to the customer. For example, assume a user 912 configures his service profile for horse racing, identifies horse racing as a preference, or is otherwise subscribed to receive gaming information related to horse racing. When that user 912 is in the Baltimore, Md., area, the user 912 might receive information about races at Pimlico Where service levels selected and paid for by user 912 allow, the user 912 may be further permitted to place wireless bets on horses racing at Pimlico When that user 912 leaves Maryland, however, the described gaming services may cease. Alternatively, the user 912 may still receive information relating to horse races at Pimlico but may be prohibited from placing bets since he is outside the state of Maryland. Similarly, a customer subscribed to receive blackjack related gaming services may at all times receive information alerting the customer to upcoming blackjack tournaments but not be able to participate in those tournaments until he travels within the legal jurisdiction of the event.

The location information used to limit the availability of gaming services to a customer may be gathered using location verification technology, which is discussed in greater detail below with regard to FIGS. 4 and 5. Generally, location verification technology may include, without limitation, "network-based" and/or "satellite-based" technology that allows for the disabling of certain gaming service applications where required by state or federal law. Thus, in the examples described above, network-based technologies such as multilateration, triangulation and geo-fencing and/or satellite-based technologies such as global positioning satellite (GPS) may be used to identify the presence or absence of the first customer in Maryland and the presence or absence of the second customer in Las Vegas.

Location information may also be to enable multi-network gaming services. Accordingly, if a communication device 913 is capable of operating on, and automatically shifting between, multiple communication networks (i.e., analog, digital, PCS, GSM, etc.), location information gathered using location verification technology may be used to sense the movement of a customer from an area serviced by one network to an area serviced by another network. In particular embodiments, the location information may enable computer 918 of service provider 920 to seamlessly transition from the first network to the second network to avoid loss of gaming services on communication device 913.

Applicable state and federal laws may also limited the availability of gaming services to users 912 of a particular age. As described above, customer database 922*b* may include account information which identifies multiple users within a family plan. The information may, in particular embodiments, specify the ages of each user within the family plan. In particular embodiments, gaming services may only be offered to those communications devices that are associated with users of legal age. Accordingly, while the family plan may include gaming services, such services may only be distributed to communication devices 913 associated with family members over the age of 18, where the law requires. Additionally or alternatively, family members who are authorized to use gaming services may be required to login to the gaming service using a login process that verifies the identity of the user before the gaming services are enabled. A login process may further prevent minors from accessing gaming services using their parents' phones.

As described above, the system described in connection with FIG. 9 is merely an example of a system for providing gaming and/or telecommunication services. It will be readily understood that system 910 may be modified in any number of ways within the scope and spirit of the detailed description. For example, although service provider 920 is described as providing both telecommunication and gaming services, it is generally recognized that service provider 920 may provide only gaming services. In such an embodiment, system 910 may include a second service provider 930 that offers telecommunication services through a computer 932. Service provider 920 may cooperate with service provider 930 to bundle telecommunication and gaming services for provision to one or more communication devices 913. In still other embodiments, service provider 930 may be external to gaming system 910.

Additionally, although two databases 922*a* and 922*b* are illustrated in FIG. 9, it is generally recognized that gaming system 910 may include fewer or more databases 922 as appropriate. Accordingly, it is recognized that the information described above as being stored in customer database 922*a* and service application database 922*b* is not mutually exclusive. Some or all of the information described as being stored in customer database 922*a* may be stored in service application database 922*b* or any other database within or without of service provider 920 and gaming system 910. Similarly, some or all of the information described as being stored in service application database 922*b* may be stored in customer database 922*a* or any other database within or without service provider 920 and gaming system 910.

FIG. 10 illustrates an example method 1010 for providing wireless gaming as a service application on a pre-existing communications network. The method begins at step 1012 with the provision of a communications service to at least one customer. As described above, in particular embodiments, the communications service may be provided on a pre-existing communications network to a user 912. For example, in certain embodiments, the communications service may include a wireless telephone service.

At step 1014, a gaming service may be offered to the at least one customer. Such an offer may be communicated to the customer using the wireless telephone service or another telecommunication service, the United States Postal Service, electronic mail, text messaging, or through any other means of communication.

As described above with regard to FIG. 9, the customer may have the option of customizing the gaming service in accordance with customer preferences. Accordingly, in particular embodiments, the offer of gaming services may identify subsets within the gaming industry for selection by the customer. The customer may identify customer interests by selecting corresponding subsets provided to the customer. Thus, a customer with a particular interest in horse racing may opt to receive information and other gaming services related to horse racing and may opt not to receive information and gaming services related to blackjack tournaments.

Where the offer for gaming services is accepted by a customer or, in some embodiments, is not declined by the customer, at least one customizable-parameter may be applied to a gaming service to create a customized gaming service at step 1016. In particular embodiments, applying the at least one customizable-parameter to the gaming service may include applying any customer preferences identified by the customer in response to step 1014. For example, gaming information and services offered by service provider 920 may be filtered to identify gaming applications related to the customer's identified interests.

As described above, a customer may subscribe to receive different levels of service. For example, in particular embodiments, the customer may subscribe to receive concierge-type services, customizable concierge-type services, and/or gambling services. Accordingly, applying the at least one customizable-parameter may include applying service level information that is associated with the customer to determine gaming applications within the appropriate service level that should be distributed to the customer.

Additionally or alternatively, applying the at least one customizable-parameter may include identifying the physical location of a gaming device associated with the customer. Example technologies for identifying the physical location of a gaming device are discussed below with regard to FIGS. 4 and 5. Specifically, network and satellite-based technologies may be used to locate a gaming device to determine the applicability of state and federal laws in that jurisdiction before gaming services are distributed. In this manner, the gaming system may avoid distributing gaming applications that are against the law in the jurisdiction in which the gaming device is located. If the customer travels to a new jurisdiction, however, the laws of the new jurisdiction may be applied to determine gaming services that may be additionally offered to the customer and gaming services that must be made inaccessible to the gaming device.

At step 1018, the customized gaming service is provided to the customer by way of the pre-existing telecommunication network. As described above, the customized gaming service may include providing a news service. The news service may include information relating to particular sports, particular sporting events, particular games, particular gaming events, or other newsworthy topics and events within the gaming industry. Additionally or alternatively, the customized gaming service may include a gambling service that allows a customer to place a bet on a sporting event or in a table game within a virtual casino.

Figure 2:
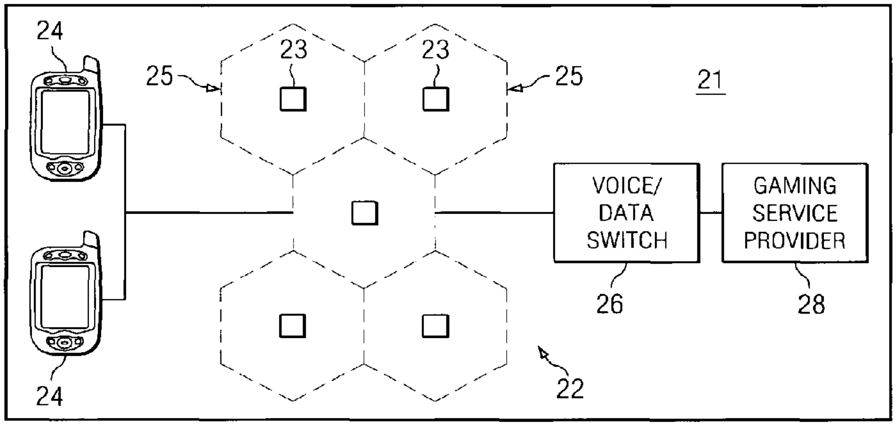
FIG. 2 illustrates a gaming system with a wireless network according to an embodiment of the present invention.

Other aspects of the various embodiments of the wireless gaming system are shown in FIGS. 2-8. According to one embodiment, as shown in FIG. 2 for example, the communications network comprises a cellular network 22. Cellular network 22 comprises a plurality of base stations 23, each of which has a corresponding coverage area 25. Base station technology is generally known and the base stations may be of any type found in a typical cellular network. The base stations may have coverage areas that overlap. Further, the coverage areas may be sectorized or non-sectorized. The network also includes mobile stations 24, which function as the gaming communication devices used by users to access the gaming system and participate in the activities available on the gaming system. Users are connected to the network of base stations via transmission and reception of radio signals. The communications network also includes at least one voice/data switch, which is preferably connected to the wireless portion of the network via a dedicated, secure landline. The communications network also includes a gaming service provider, which is likewise connected to the voice/data switch via a dedicated, secure landline. The voice/data switch may be connected to the wireless network of base stations via a mobile switching center (MSC), for example and the landline may be provided between the voice/data switch and the MSC.

Users access the gaming system by way of mobile stations which are in communication with, and thus part of, the communications network. The mobile station may be any electronic communication device that is operable in connection with the network as described. For example, in this particular embodiment, the mobile station may comprise a cellular telephone.

Preferably, in the case of a cellular network for example, the gaming system is enabled through the use of a private label carrier network. Each base station is programmed by the cellular carrier to send and receive private secure voice and/or data transmissions to and from mobile station handsets. The handsets are preferably pre-programmed with both gaming software and the carrier's authentication software. The base stations communicate via Private T-1 lines to a switch. A gaming service provider leases a private T-1 or T-3 line, which routes the calls back to gaming servers controlled by the gaming service provider. Encryption can be installed on the telephones if required by a gaming regulation authority, such as a gaming commission.

The cellular network is preferably a private, closed system. Mobile stations communicate with base stations and base stations are connected to a centralized switch located within a gaming jurisdiction. At the switch, voice calls are transported either locally or via long distance. Specific service provider gaming traffic is transported from the central switch to a gaming server at a host location, which can be a casino or other location.

As subscribers launch their specific gaming application, the handset will only talk to certain base stations with cells or sectors that have been engineered to be wholly within the gaming jurisdiction. For example, if a base station is close enough to pick up or send a signal across state lines, it will not be able to communicate with the device. When a customer uses the device for gaming, the system may prohibit, if desired, the making or receiving voice calls. Moreover, voice can be eliminated entirely if required. Further, the devices are preferably not allowed to "connect" to the Internet. This ensures a high level of certainty that bets/wagers originate and terminate within the boundaries of the gaming jurisdiction and the "private" wireless system cannot be circumvented or bypassed. Although in certain embodiments some data and/or voice traffic may be communicated at least partially over the Internet, it is preferred that the communication path does not include the Internet. Alternatively, in some embodiments, certain non-gaming information may be transported over a path which includes the Internet, while other information relating to the gaming activities of the system is transported on a path that does not include the Internet.

Figure 3:
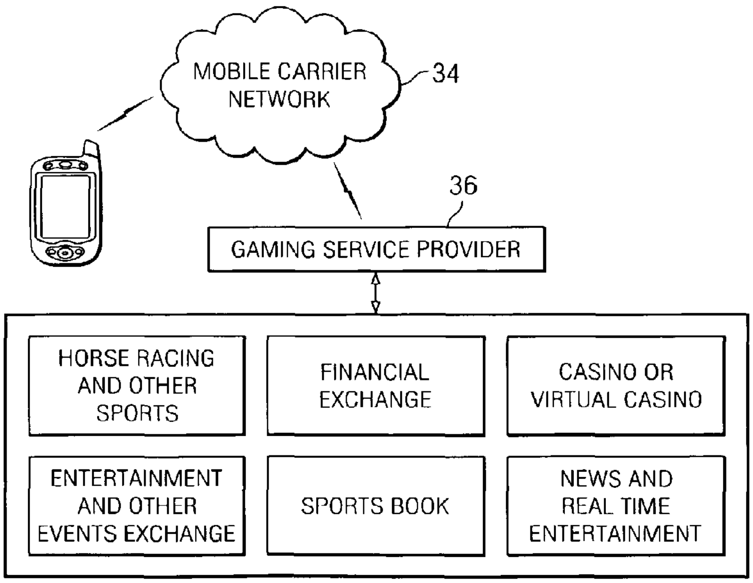
FIG. 3 is a block diagram of a gaming system illustrating various gaming activities in accordance with an embodiment of the present invention.

As shown in FIG. 3, a gaming communication device 32 is in communication with a gaming service provider over a network 34. The gaming service provider preferably has one or more servers, on which are resident various gaming and other applications. As shown in FIG. 3, some example gaming applications include horse racing and other sports, financial exchange, casino and/or virtual casino, entertainment and other events exchange, and news and real time entertainment. Each of these applications may be embodied in one or more software modules. The applications may be combined in any possible combination. Additionally, it should be understood that these applications are not exhaustive and that other applications may exist to provide an environment to the user that is associated with any of the described or potential gaming or related activities.

Figure 4:
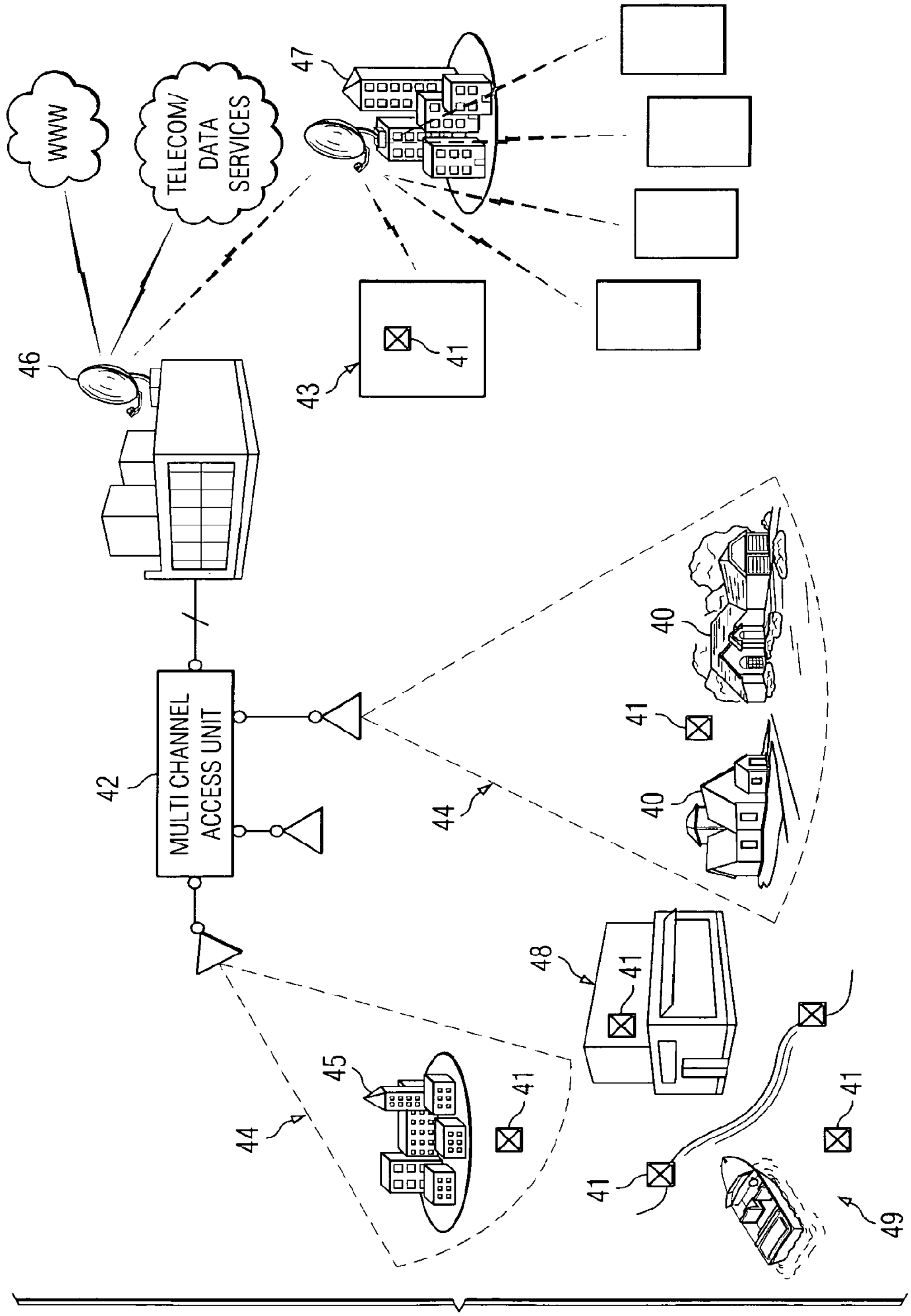
FIG. 4 illustrates a gaming system showing coverage areas in accordance with an embodiment of the present invention.

In another embodiment, as shown in FIG. 4, for example, the communications network comprises a private wireless network. The private wireless network may include, for example, an 802.11x (WiFi) network technology to cover "Game Spots" or "Entertainment Spots." In FIG. 4, various WiFi networks are indicated as networks 41. Networks 41 may use other communications protocols to provide a private wireless network including, but not limited to, 802.16x (WiMax) technology. Further, networks 41 may be interconnected. Also, a gaming system may comprise a combination of networks as depicted in FIG. 4. For example, there is shown a combination of private wireless networks 16, a cellular network comprising a multi-channel access unit or sectorized base station 42, and a satellite network comprising one or more satellites 46.

With respect to the private wireless network, because certain embodiments of the technology cover smaller areas and provide very high-speed throughput, the private wireless network is particularly well-suited for gaming commission needs of location and identity verification for the gaming service provider products. The gaming spots enabled by networks 41 may include a current casino area 48, new areas such as swimming pools, lakes or other recreational areas 49, guest rooms and restaurants such as might be found in casino 48 or hotels 45 and 47, residential areas 40, and other remote gaming areas 43. The configuration of the overall gaming system depicted in FIG. 4 is intended only as an example and may be modified within the scope of the present invention.

In one embodiment, the system architecture for the gaming system includes:

(1) a wireless LAN (Local Access Network) component, which consists of mostly 802.11x (WiFi) and/or 802.16x WiMax technologies; robust security and authentication software; gaming software; mobile carrier approved handsets with Windows® or Symbian® operating systems integrated within; and (a) CDMA-technology that is secure for over-the-air data protection;

(b) at least two layers of user authentication, (that provided by the mobile carrier and that provided by the gaming service provider);

(c) compulsory tunneling (static routing) to gaming servers;

(d) end-to-end encryption at the application layer; and (e) state-of-the-art firewall and DMZ technologies;

(2) an MWAN (Metropolitan Wireless Access Network), which consists of licensed and license-exempt, point-to-point links, as well as licensed and license-exempt, point-to-multi-point technologies;

(3) private MAN (Metropolitan Access Network) T-1 and T-3 lines to provide connectivity where wireless services cannot reach; and (4) redundant private-line communications from the mobile switch back to the gaming server.

Each of the "Game Spots" or "Entertainment Spots" is preferably connected via the MWAN/MAN back to central and redundant game servers. For accessing the private wireless networks 41, the gaming communication devices are preferably WiFi- or WiMax-enabled PDAs or mini-laptops, and do not have to be managed by a third-party partner.

Preferably, the gaming system includes a location verification feature, which is operable to permit or disable gaming from a remote location depending upon whether or not the location meets one or more criteria. The criterion may be, for example, whether the location is within a pre-defined area in which gaming is permitted by law. As another example, the criterion may be whether the location is in a no-gaming zone, such as a school. The location verification technology used in the system may include, without limitation, "network-based" and/or "satellite-based" technology. Network-based technology may included such technologies as multilateration, triangulation and geo-fencing, for example. Satellite-based technologies may include global positioning satellite (GPS) technology, for example.

As previously discussed, the cellular approach preferably includes the use of at least one cellular, mobile, voice and data network. For gaming in certain jurisdictions, such as Nevada for example, the technology may involve triangulation, global positioning satellite (GPS) technology, and/or geo-fencing to avoid the potential for bets or wagers to be made outside Nevada state lines. In one embodiment, the network would not cover all of a particular jurisdiction, such as Nevada. For instance, the network would not cover areas in which cellular coverage for a particular base station straddled the state line or other boundary of the jurisdiction. This is done in order to permit the use of location verification to insure against the chance of bets originating or terminating outside of the state. Triangulation may be used as a method for preventing gaming from unapproved locations. Triangulation may be accomplished, for example, by comparing the signal strength from a single mobile station received at multiple base stations, each having GPS coordinates. This technology may be used to pinpoint the location of a mobile station. The location can then be compared to a map or other resource to determine whether the user of the mobile station is in an unapproved area, such as a school. Alternatively, GPS technology may be used for these purposes.

Figure 5:
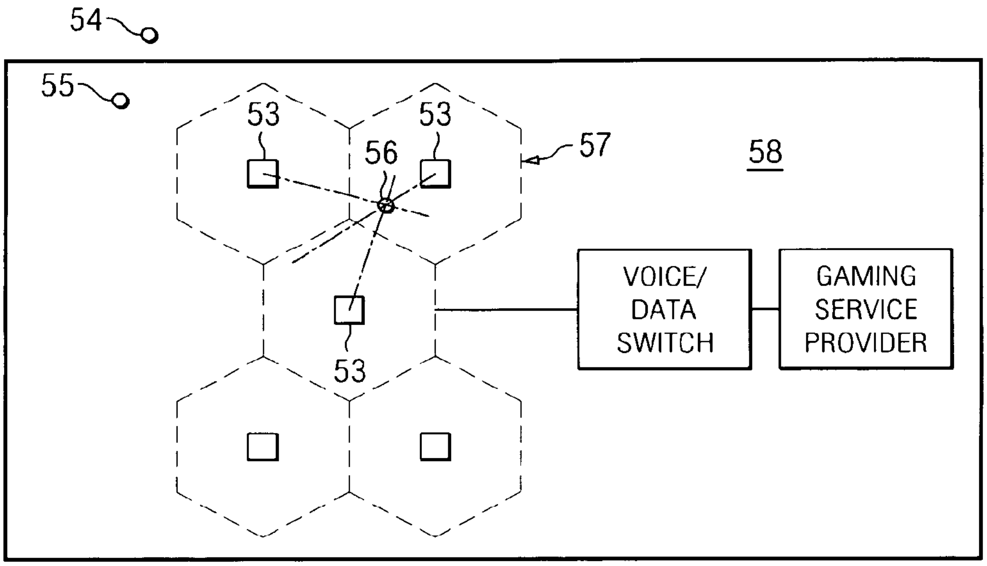
FIG. 5 illustrates a gaming system with a wireless network showing triangulation location determination in accordance with an embodiment of the present invention.

As shown in FIG. 5, the gaming system includes a plurality of gaming communication devices 54, 55, and 56. Device 54 is located outside the gaming jurisdiction 58. Devices 55 and 56 are both located inside gaming jurisdiction 58. However only device 56 is located within geo-fence 57, which is established by the coverage areas of a plurality of base station 53. Thus, geo-fencing may be used to enable gaming via device 56 but disable gaming via devices 54 and 55. Even though some gaming communication devices that are within the gaming jurisdiction 58, such as device 55, are not permitted access to the gaming system, the geo-fence 57 ensures that no gaming communication devices outside jurisdiction 58, such as device 54, are permitted access.

Geo-fencing does not specify location. Rather, it ensures that a mobile station is within certain boundaries. For instance, geo-fencing may be used to ensure that a mobile station beyond state lines does not access the gaming system. Triangulation on the other hand specifies a pinpoint, or near-pinpoint, location. For example, as shown in FIG. 5, device 56 is triangulated between three of the base stations 53 to determine the location of device 56. Triangulation may be used to identify whether a device, such as a mobile station, is located in a specific spot where gambling is unauthorized (such as, for example, a school). Preferably, the location determination technology utilized in conjunction with the present invention meets the Federal Communication Commission's (FCC's) Phase 2 E911 requirements. Geological Institute Survey (GIS) mapping may also be utilized to compare identified coordinates of a gaming communication device with GIS map features or elements to determine whether a device is in an area not authorized for gaming. It should be noted that any type of location verification may be used such as triangulation, geo-fencing, global positioning satellite (GPS) technology, or any other type of location determining technology, which can be used to ensure, or provide an acceptable level of confidence, that the user is within an approved gaming area.

In another embodiment, location verification is accomplished using channel address checking or location verification using some other identifying number or piece of information indicative of which network or portion of a network is being accessed by the gaming communication device. Assuming the using of an identifying number for this purpose, then according to one method of location checking, as an example, a participant accesses the gaming system via a mobile telephone. The identifying number of the mobile telephone, or of the network component being accessed by the mobile telephone, identifies the caller's connection to the mobile network. The number is indicative of the fact that the caller is in a defined area and is on a certain mobile network. A server application may be resident on the mobile telephone to communicate this information via the network to the gaming service provider. In a related embodiment, the identifying number or information is passed from a first network provider to a second network provider. For example, a caller's home network may be that provided by the second provider, but the caller is roaming on a network (and in a jurisdiction) provided by the first provider. The first provider passes the identifying information through to the second provider to enable the second provider to determine whether the caller is in a defined area that does or does not allow the relevant gaming activity. Preferably the gaming service provider either maintains, or has access to, a database that maps the various possible worldwide mobile network identifying numbers to geographic areas. The invention contemplates using any number or proxy that indicates a network, portion of a network, or network component, which is being connected with a mobile telephone. The identifying number may indicate one or more of a base station or group of base stations, a line, a channel, a trunk, a switch, a router, a repeater, etc.

In another embodiment, when the user connects his mobile telephone to the gaming server, the gaming server draws the network identifying information and communicates that information to the gaming service provider. The software resident on the gaming communication device may incorporate functionality that will, upon login or access by the user, determine the user's location (based at least in part on the identifying information) and send a message to the gaming service provider. The identifying number or information used to determine location may be country-specific, state-specific, town-specific, or specific to some other definable boundaries.

In connection with any of the location determination methods, the gaming system may periodically update the location determination information. This may be done, for example, during a gaming session, at pre-defined time intervals to ensure that movement of the gaming communication device to an unauthorized area is detected during play, and not just upon login or initial access.

Thus, depending on the location determination technology being used, the decision whether to permit or prohibit a gaming activity may be made at the gaming communication device, at the gaming server, or at any of the components of the telecommunication network being used to transmit information between the gaming communication device and the gaming server (such as at a base station, for example).

An aspect of the private wireless network related to preventing gaming in unauthorized areas is the placement of sensors, such as Radio Frequency Identification (RFID) sensors on the gaming communication devices. The sensors trigger alarms if users take the devices outside the approved gaming areas. Further, the devices may be "tethered" to immovable objects. Users might simply log in to such devices using their ID and password.

In connection with FIG. 6, an example embodiment of a method according to the present invention can be described as follows. As discussed, software is preferably loaded on a gaming communication device and is operable to receive input data for gaming. The input data may originate at associated gaming software resident on the gaming server, or it may be input by the user of the gaming communication device. The software on the device is operable to present a representation of a gaming environment. This can include, among other things, a representation of a table game such as a blackjack table or a slot machine. Other examples of the representation of a gaming environment include graphical representations of any of the other applications described herein.

Figure 6:
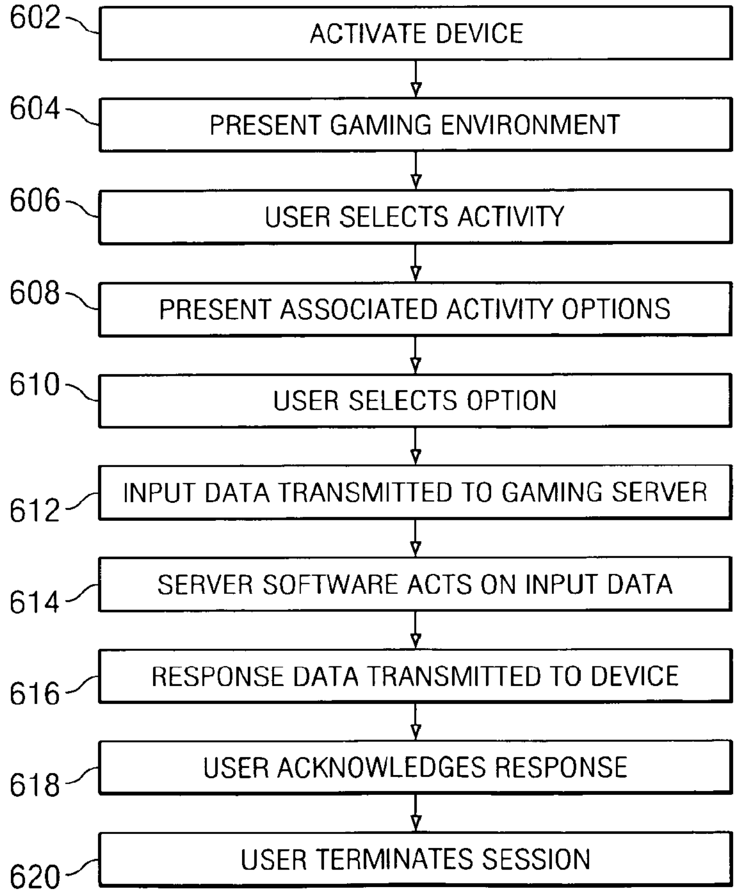
FIG. 6 is a flow chart depicting steps in a gaming method according to an embodiment of the present invention.

In the example method shown in FIG. 6, in a first step 602, the gaming communication device is activated. This may take place as a function of turning on a phone, PDA, or other communication device as described elsewhere herein. Preferably, activation comprises connecting the gaming communication device to a private data network. Part of the activation includes logging in at a prompt. This may be considered as a first level of authentication of a user of the gaming communication device. A second level of user authentication comprises authentication of the gaming communication device itself. This may occur, for example, by authentication of a mobile station by a mobile carrier. A third level of user identification may comprise biometrics. Various examples of biometrics may include, but are not limited to, fingerprint identification, photo identification, retina scanning, voice print matching, etc.

In a next step 604, the user is presented with the gaming environment. The gaming environment may be presented in various stages. For instance, in a first stage, the gaming environment may comprise a casino lobby where the user is presented with certain gaming options including, for example, table games, slots, sports book, video poker, and a casino cashier. In a subsequent stage, the user may be presented with optional instances of the type of activity selected from the casino lobby.

In a next step 606, the user selects an activity, such as a particular casino table game. In step 608, the user is presented with one or more options related to the selected activity. In step 610, the user selects an option. For instance, at this point, the user might place a wager, draw a card, select a restaurant or restaurant menu item, select a news source or a news story, place a buy or sell order on a financial exchange, place a bet on a certain box office performance over/under amount for a given movie, etc. The options for user input are myriad. In step 612, the software resident on the gaming communication device accepts the option input by the user and transmits the input data to the software resident at the gaming server. In step 614, the gaming server software acts on the input data.

Actions at this point, may include, without limitation, determining an outcome and/or amount, accessing another server and/or software application, retrieving information, preparing a response to the user, etc. The action of determining an outcome and/or amount might take place, for example, if the user is using the device to place wagers in connection with a gambling activity. For certain gambling activities, such as a table game or slot machine, a random number generator may be incorporated to determine the outcome (i.e., whether the user won or lost) and the gaming server software would also determine an amount won or lost based on the amount wagered and any applicable odds. The action of accessing another server and/or software application might occur, for example, in the event the user is engaging in a services activity such as accessing news services, making reservations and placing food and beverage orders at a restaurant, or making a retail purchase. The action of retrieving information might occur when the gaming server software is prompted to access another server for the purpose of retrieving a certain type of information requested by the user.

Preferably, the gaming server software prepares a response to the user's input data and in step 616. In step 618, the user acknowledges the response. For example, in the case of gambling, the user might acknowledge that he won a hand of blackjack because the dealer busted and that his payout was $100 based on a $50 bet at even odds. In step 620, the user logs out.

In the situation where the user is gambling, after the series of steps described in connection with FIG. 6, (or a subset or modified series of steps), the user physically enters a casino and goes to a casino cashier for payout and/or settlement (which can include, for example, extensions of credit or advance deposits). In one embodiment, there is a waiting period (e.g., twenty-four hours) before the user can collect winnings. The purpose of the waiting period is to allow time for fraud monitoring. The waiting period may depend on the amount of the balance. For example, if the user is owed less than $5,000 the waiting period may be twelve hours. If the user is owed between $5,000 and $10,000 the waiting period may be twenty-four hours. If the user is owed more than $10,000 the waiting period may be forty-eight hours.

The duration of activation of the gaming communication device, the duration of a particular session, and/or the duration of a particular activity may be controlled according to any number of different parameters. For example, the duration may be based on a predetermined amount of time or period of time. Activation of the gaming communication device may terminate upon the expiration of a predetermined time period. As another example, an activity may only be permitted until the occurrence of a particular time of day. According to an alternative, an administrator, or another party to a transaction within any of the various activities, may determine the time period or amount of time. According to yet another alternative, the duration may end upon the occurrence of an event such as the user entering or leaving a particular location. The duration of activation may be dynamically determined based on a period of non-use. In other words, after a predetermined time without being used, the device may "time out" and be deactivated. The period of time, or amount of time, may be cumulatively determined. For example, an activity may only be permitted for a period of five hours, collectively. Time counting toward the five hours might stop and start depending upon the location of the user. As another example, an activity might only be permitted so long as the user does not enter or leave a particular location for longer than a predetermined period of time.

Similarly, activation of the gaming communication device and/or the ability for a user to engage in a particular activity may only be permitted during a specified time of day, or for a particular period of time prior to an event, or for a particular period of time after notification to the user. Also, activation and/or access may be controlled based upon the location of the user. For example, if a user is in a particular casino in which a particular show will take place that evening, the user might be notified that tickets to the show are available for a specified period of time prior to the show. The user might only be permitted to engage in the activity of purchasing tickets for the show if the user is in the casino and during the specified period of time prior to the show. For example, the user might only be able to purchase tickets while in the casino and up to five minutes before the start time of the show. Similarly, the activation of the device may be restricted based on the location of the user and a corresponding period of time. For example, if a user is in a location where a show is occurring, or is going to occur, the device may be deactivated (either automatically, or by a party other than the user) during a period beginning five minutes prior to the show and ending five minutes after the end of the show.

According to another alternative, the duration or enablement of one activity might be determined by the participation of the user in another activity. For example, a user might be allowed to make dinner reservations at a popular restaurant if the user has been gambling enough at a given casino. In this way, bonuses or comps may be determined or managed based on the activity of the user via the gaming communication device.

Figure 7:
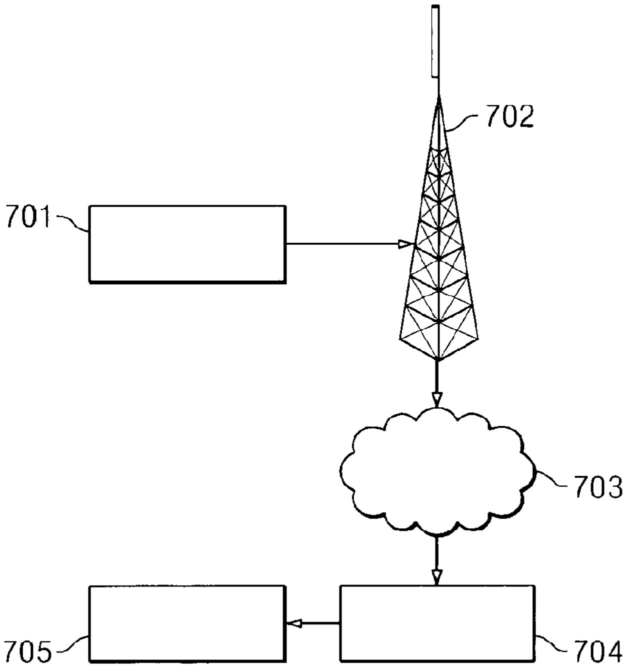
FIG. 7 depicts a gaming system showing a communication path in accordance with an embodiment of the present invention.

Preferably, data is transmitted back and forth during the gaming activities between the gaming communication device and a server controlled by the gaming service provider. An example of the path of communication is shown in FIG. 7. Gaming data, such as a wager placed by the user, is transmitted from gaming communication device 701 to a base station 702 (or a transmitter in the case of a private wireless network such as a WiFi or WiMax network). Base station 702 routes the data through network 703 to a hub or gateway 704, which in turn routes the data to a gaming server 705 operated by a gaming service provider. Preferably, the communication from gaming communication device 701 to the network 703 comprises wireless communication. This may be any type of known wireless communication or any type of wireless communication available in the future. Examples of acceptable wireless communication protocols include CDMA, GSM, and GPRS.

Preferably, the communication from the network 703 to the gateway 704 and to the server 705 is conducted over secure land lines. FIG. 7 is an example communication network only and the present invention should be understood to cover other networks in which data may be transmitted from gaming communication device 701 to server 705. Preferably, data in response to data being transmitted from gaming communication device 701 to server 705 is transmitted back to gaming communication device 701 along a path essentially opposite to the path of the first transmission. It should be noted that in at least certain embodiments of the methods and systems described herein, a user is not actually playing a game on the gaming communication device. Rather, the user is actually playing the game on the server controlled by the gaming service provider, which may be located within a casino.

With respect to payment and/or receipt of winnings and losses, one possible approach is as follows. Upon check-in at a casino hotel, a hotel representative may query a guest as to whether the guest wants access to a gaming communication device. If the guest does want such access, the hotel representative may provide the guest with a gaming communication device in exchange for a credit-card type deposit or other deposit. The guest then deposits money into an account for wireless gaming. The guest's account balance information is loaded onto the guest's account file, which is preferably maintained on the gaming server. The user may load money into his gaming account by establishing a credit account, for example, at a casino cashier and/or by paying cash to the casino cashier. Many other alternatives exist and this process is an example only. Guest accounts or gaming communication devices may be preloaded with funds. Funds may be deposited during a gaming session. This may occur, for example, if a user selected a casino cashier activity from the gaming environment and instructed the cashier to add funds to the account. The finance subsystem may also utilize account card technology (such as ATM cards, credit cards, stored value cards, gift cards, etc) in order to conduct financial transactions associated with a user's account. Moreover, the user may receive or make payments remotely, by way of inputting instructions via the gaming communication device or by another remote device such as an automatic teller machine (ATM), which is in electronic communication with the gaming server or other server operated by the casino, hotel, gaming service provider or other entity involved in the gaming activities. For example, a user might remotely (via the gaming communication device) place an order at a restaurant. Then, the user might make advance payment for the meal at an ATM-type machine which is operable to receive instructions corresponding to the financial transaction requirements of the gaming activity of ordering food.

A unique aspect of the present invention includes establishing an electronic record of the gaming transactions undertaken by a user. Preferably, this is accomplished by utilization of a keystroke log, which is an electronic record of all keystrokes made by the user. Utilization of a keystroke log in this context allows for unprecedented monitoring of a user's gaming activity. In the event of a dispute, one may refer to the keystroke log and readily determine whether, in fact, a user placed a particular wager, for example.

An additional possible aspect of the electronic record is to allow a gaming control board or other regulatory authority, access to the electronic record in a direct manner in order to conduct periodic independent monitoring of the gaming activities conducted over the system. Another possible aspect is to allow policing against rigged machines. For instance, it is possible that the gaming control board (or other regulatory authority) could obtain a gaming communication device and compare their test results over time against records in the electronic record database (e.g., by comparing the results shown in the keystroke log). This essentially comprises electronic access for testing.

Figure 8:
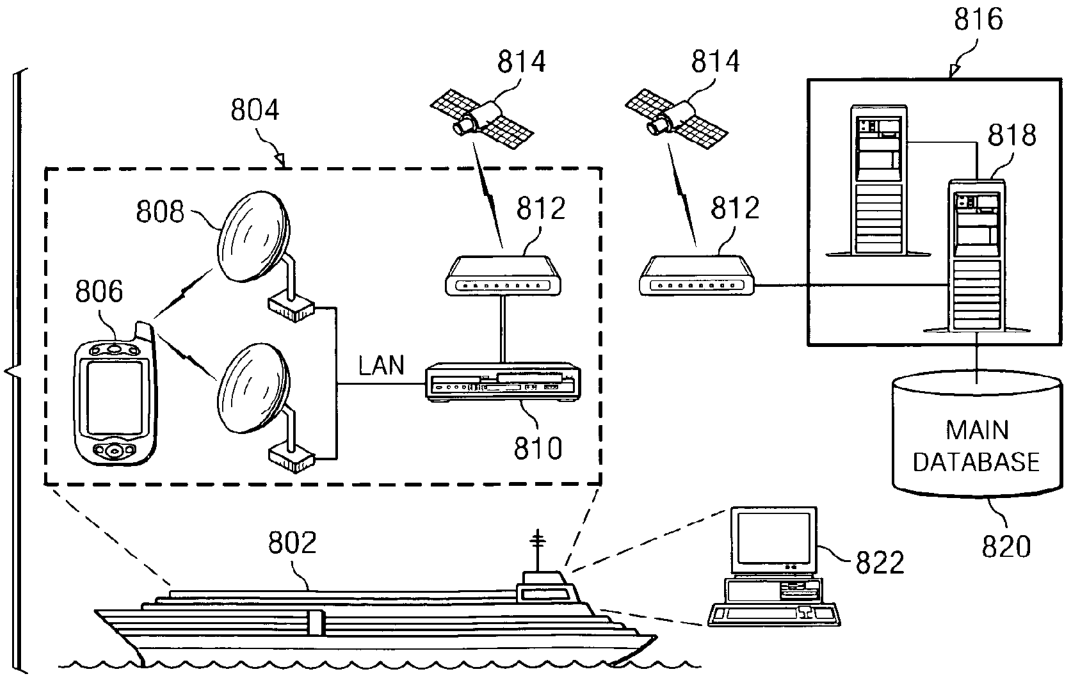
FIG. 8 illustrates a ship-based gaming system in accordance with an embodiment of the present invention.

In another embodiment of the invention, as shown in FIG. 8, a ship-based gaming system is provided. The system preferably comprises passenger vessel 802, such as a cruise liner for example. The system includes one or more gaming communication devices 806 connected to a communication network. The network shown in FIG. 8 comprises a mobile network with base stations 808 connected via a LAN to a base station controller (BSC) 810. BSC 810 is connected via a T1 interface to a first Very Small Aperture Terminal (VSAT) modem 812, which is in communication with a first satellite 814. First satellite 814 is operable to transmit and receive signals from second satellite 814, which is in communication with second VSAT modem 812. Second VSAT modem 812 is in communication with a gaming server 818 located at gaming service provider 816. Gaming server is coupled to gaming database 820. Again, the network configuration depicted in FIG. 8 is for example purposes only, and other configurations are within the scope of the present invention. An on-board back office 822 is preferably provided. Data is communicated by the on-board VSAT modem and transmitter to the first satellite for relay to the second (preferably land-based) VSAT receiver and modem. The data is then communicated to a server and/or centralized database via a mobile station controller (not shown).

A corresponding business model involves the gaming service provider contracting with a cruise line, which agrees to allow the gaming service provider to provide coverage throughout the cruise line's ship(s), by using repeaters for example. The gaming service provider may provide a private wireless network, in which case any revenue generated from use of or access to the private wireless network, and revenue from gaming activities, may be allocated among all or any subset of the cruise line and the gaming service provider. Alternatively, the gaming service provider may contract with a mobile carrier and a satellite provider, in which case revenue from the mobile calls, and revenue from gaming activities, may be allocated among all or any subset of the cruise line, the mobile carrier and the gaming service provider.

There are several scenarios for a user's activity relative to transactions conducted over the gaming system. In one example scenario the user is in a fixed, but remote, location from the gaming server, which may be located on the premises of a casino. This may be include, for instance, a situation in which the gaming communication device is a kiosk or some other communication device which is in a fixed position or which is tethered to a fixed position so that the gaming communication device cannot be moved beyond a certain area. In another example scenario, the user starts a gaming transaction at a first location and ends the transaction at a second location different from the first location. In another example scenario, the user is mobile during a single gaming transaction. In another example scenario, the user is mobile within a first approved area then (during the gaming transaction) the user moves outside the first approved area, through an unapproved area, to a remote second approved area.

In an alternative embodiment, the gaming system may be configured to operate as a "curb-to-curb" gaming system. In such a system, a communication path may be established between the device and a particular server, based upon whether the user is in a location corresponding to that particular server. For example, the user might enter a first casino, or an authorized area associated with the first casino, and thereby activate the establishment of a communication path between the device and a server located at and/or controlled by the first casino. While the user is on the premises of the first casino, the user might be able to participate in activities, such as playing blackjack, at the first casino. Then, if the user leaves the first casino, the gaming system might be configured to terminate the first communication path (i.e., between the device and the first casino's server), or otherwise deactivate the device and/or terminate the user's ability to use the device to participate in activities associated with the first casino. When the user enters a second casino, or an authorized area associated with the second casino, a second communication path (e.g., between the device and a second server located at or controlled by the second casino) may be established. Thus, the user would now be able to play blackjack (or engage in other activities) at the second casino, rather than the first casino.

As another example, a particular casino is often related to other casinos within a jurisdiction or specified area. Under such a scenario, if a user entered any of the related casinos, then the appropriate communication path or paths could be established between the gaming communication device and one or more of the casinos in the group of related casinos, thereby enabling the user to play casino games (or engage in other activities) at the one or more casinos in the group of related casinos. Depending on regulatory requirements, the preferred configuration might be to establish a communication path with a server at a particular casino within the group at which the user wants to play. Then, a different communication path could be established at a subsequent casino if the user wants to play at another casino. Under certain circumstances, and again depending on regulatory requirements, some information associated with user activity might be maintained at a centralized server accessible by more than one casino within the group.

In another example embodiment, the gaming system may be used to enable gaming activities involving multiple wireless users who interact with one another. For instance, the system may enable a table game (such as blackjack) in which a first user and a second user are conducting gaming transactions on the same table and in which options selected by the first user directly impact outcomes and options relative to the second user. Preferably, the gaming environment presented on the gaming communication devices of both the first and second users will indicate the existence and activity of the other respective user. Another example of multiple users interacting on the gaming system is the provision of a poker game in which users place bets against one another instead of, or in addition to, placing bets against the house. Another example of interaction between users is when a first user makes restaurant reservations or purchases event tickets, thereby reducing the options available to the second user.

Preferably, the gaming service provider provides at least the following functions. First the gaming service provider provides and controls the one or more gaming servers. These servers may be physically located within the confines of the gaming service provider or may exist at a remote location. As mentioned, the gaming servers may also be located at or near a games provider such as a casino, casino hotel, racino, cruise ship, race track, etc. The gaming service provider may also provide monitoring services such as transaction monitoring and key stroke logging services. The gaming service provider may also provide data management and security services. These services are not intended to be exhaustive and the gaming service provider may provide other services which facilitate the gaming process.

It should be noted that the invention can be implemented in connection with any gaming environment or an environment for any other activity, which may be conducted electronically. The invention is not limited to Nevada or any other particular gaming jurisdiction. For instance, the invention can be employed in connection with casinos in Atlantic City, N.J., international jurisdictions, Native American gaming facilities, and "racinos" which are race tracks that also have slot machines, video lottery terminals, or other gambling devices. For example, in connection with "racinos," the invention might be used by participants who wish to play slot machine games while they are viewing race horses in the paddock area. This might be desirable in the event that the slot machine area does not allow smoking and a participant wishes to gamble from an outdoor smoking area. Alternatively, the slot machine area might permit smoking and the gambler wishes to play the slot machines from an area where he or she can avoid breathing second-hand smoke. Numerous other scenarios can be envisioned in which the gaming participant can use the invention to participate in remote gaming, while enjoying some other primary activity in a location remote from the gaming facility. Further, the invention is not limited to gaming, but can include other applications, such as trading financial instruments, and wagering on other types of events, such as elections, award events, or any other activity.

Another example embodiment involves the application of one or more of the methods and systems described herein to the activity of conducting financial transactions. Thus, the gaming communication device may be configured to enable a user to conduct such financial transactions, which may include, without limitation, any transaction involving a financial institution, such as banking, trading securities, or managing 401K or other investment fund assets. Preferably, a communication path would be established between the user and any of the servers or other computers necessary to conduct the financial transaction. As with certain other embodiments the ability to engage in this activity may be controlled by one or more parameters including location and/or identity verification and time or duration limits.

Conducting financial transactions may be one of the activities presented to the user of the gaming communication device. Any of the possible financial transactions might be presented as sub-activities. As an example, a user might want to trade securities listed on a particular exchange. Regulations might require the trader to be located within a certain jurisdiction to execute trades on the exchange. The exchange might have its own rules and could require that the trader be located on the premises. With the location verification techniques described elsewhere herein, the particular financial transaction activity might only be enabled if the user is located in a particular geographic area, for example.

As a related feature, the system may be configured to provide a credit verification feature, according to which a user's creditworthiness may be checked by a party to a transaction, or by which the user might apply for credit. For example, if a user wants to purchase $10,000 worth of a particular stock, then a communication path might be established between the user and a server located at and/or controlled by an exchange upon which the stock is being traded. An additional communication path might be established between the exchange server and a server of an account manager that manages the user's account. These communication paths would enable the basic transaction—that of the user purchasing the stock. Yet another communication path, however, might be established between a seller's server, the exchange server, and/or the account manager server and a server located at and/or controlled by a credit agency. This path would enable an interested party to the transaction to check and/or approve the user's credit to prior enabling the transaction.

According to one aspect of certain embodiments, a user of the gaming communication device can connect from the device to a financial service provider's server to provide a "Push to Trade" feature. In order to enable this feature, the device is configured to be capable of facilitating a "Push to Talk" protocol, whereby the device behaves like a walkie-talkie. Thus, the device may include any suitable program or application that enables the Push to Talk feature. As used herein, the phrase "Push to Talk" includes any protocol that allows for a direct connection feature for an end user. Included are all such protocols (e.g. Instant Talk, Fastchat, etc.) within the broad rubric of "Push to Talk" including those that provide wide-area, instantaneous contact.

The Push to Talk protocol allows a given device to instantly connect to any number of other devices, such as any other telephone (mobile or landline-based), personal computer, laptop, etc. The connection for the end user does not have to be spawned by any conventional dialing or by triggering some form of automatic dialing. A simple button can be depressed to provide the requisite connection. In the context of timing, Nextel (who developed the original Push to Talk technology) suggests that their Push to Talk protocol should connect within 2 seconds.

A related technology is Push to Talk Over Cellular (PoC). PoC service is a form of interactive voice messaging that combines walkie-talkie and cellular phone connectivity, allowing users to quickly connect with another person or an entire group of friends and contacts at the push of a button on a PoC-enabled handset.

The Push to Talk protocol allows users to use the walkie-talkie paradigm over an IP or a cellular network, which diminishes the boundary limitations of a conventional two-way radio. The Push to Talk service is based on a disruptive technology. Latency is an issue during some traditional mobile telephone conversations. One appeal of the Push to Talk platform, as compared to executing a traditional telephone call, is being able to talk to an individual or to a group of individuals instantly, without waiting for someone to answer due to latency issues. Another benefit of the Push to Talk feature is a shorter than normal phone call, which cuts down on dialing costs for corresponding end users. Nextel estimates that the average Push to Talk call lasts forty seconds. Push to Talk technology is compatible with virtually any network communications; for example, the Push to Talk protocol may readily be used in conjunction with cellular telephone networks, including GSM and CDMA. The network equipment used for the Push to Talk feature is currently being offered by companies such as Ericsson Motorola, Siemens, Sony Ericsson, and Nextel.

Because Push to Talk effectively turns the handheld device into a walkie-talkie, it not only successfully enables end users to send voice messages, it also enables immediate data texts (commonly referred to as "direct messaging"). Push to Talk messaging represents a significant improvement over short messaging systems in bypassing the slow and clumsy process of entering text via a phone keypad. This makes text messaging quicker and more effective.

According to the "Push to Trade" feature, once the end user initiates the call, the financial service provider is instantly connected to the end user. In one embodiment, the financial service provider has one or more electronic trade desks that are dedicated to this feature for their clients. Thus, all "Push to Trade" requests may be received at this location. In other embodiments, any suitable entity, broker, standard trading desk, or electronic device may receive such Push to Trade communications.

Once the connection has been established, the financial service provider may then simply conduct the trade as prescribed by the end user. For example, upon connection, the end user may be presented with the financial or market environment in which he seeks to participate. The trade desk representative or device can query the end user to execute an electronic or a broker-assisted trade. In addition, the financial environment may be presented in various stages. For instance, in a first stage, the financial environment may comprise a financial summary of all markets where the user is presented with certain financial options including, for example, specific market summaries, specific prices for selected assets (e.g. commodities, stocks, bonds, etc.), current positions, buying power, etc. In a subsequent stage, the user may be presented with optional instances of the type of activity selected from the market platform.

From this platform, the end user can select an activity, such as a particular type of trade. Thus, the user is presented with one or more options related to the selected activity. For instance, at this point, the user might place a buy or a sell order on a financial exchange. The software, which may be resident on the device, on the server, or on a combination of both, accepts the option input by the user and transmits the input data to the financial service provider. Subsequently, the financial service provider acts on the input data. The Push to Talk technology readily accommodates a voice log of the transaction for audit or confirmation purposes. Hence, a digital voice storage may be provided, whereby the transaction (e.g., inclusive of bid and ask prices) is recorded. In addition, the automatic voice log can then relay this information back to the end user (e.g., via his e-mail or via a conventional postal mail service). This could occur as a matter of course such that the end user is routinely provided with a suitable confirmation receipt for all of his trading activity.

Actions at this point may include, without limitation, determining an outcome and/or amount for the trade, accessing another server and/or software application, retrieving additional information, preparing a suitable response to the user, etc. The action of determining an outcome and/or amount might take place, for example, if the user is using the device to place trades in conjunction with his account and a given exchange. Hence, this could include a formal tallying of the executed trade, inclusive of the charged commission, the amount debited from the account to cover the trade, etc. The action of accessing another server and/or software application might occur, for example, in the event the user is engaging in a services activity such as accessing news services. The action of retrieving information might occur when the financial software is prompted to access another server for the purpose of retrieving a certain type of information requested by the user. The financial service provider can then prepare a response to the user's input data. Once this activity has concluded, the user can acknowledge the response and then log out and terminate his session.

It should be noted that the "Push to Trade" feature can be used in other applications of the gaming technology described herein. For example, in an application where the user of the gaming communication device is playing blackjack from an authorized area outside the casino gaming area, the Push to Trade feature would enable the user to participate audibly in the blackjack game actually taking place within the casino gaming area. The Push to Talk technology would allow the user to immediately and virtually "sit down" at an actual blackjack table without the delay caused by the conventional setup and tear down process of certain traditional telecommunication protocols. Also, once the user is participating in the game, the user can communicate orally with the dealer, or other players that are physically at the table, without the latency issues of certain mobile telecommunication systems.

In at least one embodiment, the invention provides jurisdictional controls, which limit gaming to approved geographical areas. The invention may also include an age/identity verification feature. This can be accomplished through any applicable technique including retina scanning, finger print identification, voice print matching, or other biometrics. Identity verification can also be accomplished by having a customer take a picture of himself (e.g., by use of a digital picture phone) and transmitting the picture to the gaming service provider for comparison to a stored picture of the pre-approved user. Identity verification can also be accomplished by way of comparison of participant provided data to stored data, and execution of electronic agreements or contracts by the participant. Identity verification can also be accomplished by monitoring a keystroke characteristic (e.g., rhythm, patterns, or cadence) of the user, or any other method in which a parameter uniquely associated with the user can be observed. The invention may also provide for the logging of keystrokes. In at least one embodiment, all communications are accomplished without accessing the Internet.

Mobile, remote gaming may be desirable for many reasons, some of which have already been described. The invention may allow supplementation of existing in-house gaming revenue by allowing bettors to place bets while enjoying other leisure activities such as golf, swimming, dining and shows. The invention may complement the new coinless wagering environment as bettors can play their favorite games outside the casino. The invention provides a high-speed, reliable, accurate, and secure mobile gaming environment that complies with regulatory requirements for identification and location verification of the bettor with the ability to generate key stroke logs. The invention may restrict unauthorized usage from a geographic perspective and is capable of implementation using location verification technology (e.g., geo-fencing) to conform the gaming activities to legal parameters. Consumers may benefit from an increased choice of gaming environments.

Consumers will be able to bet in whatever surroundings they prefer, benefiting from the knowledge that the product is regulated, fair and secure while enjoying the gaming experience at the speed they choose without external influences, such as that which might occur within the in-house casino environment. The gaming businesses can use the invention to increase their revenue base through a new, regulated, mobile, remote channel. Customers wanting to be entertained during downtime or outside a casino will be able to play games on their gaming communication device and customers intimidated by a traditional casino environment will be able to play in private. The gaming jurisdictions may benefit from an increase in gaming an ancillary revenue growth because customers will have a more enjoyable experience.

The invention may also be used to deliver content at an increased speed compared to traditional telecommunications systems. The content may include, for example, live reports, entertainment, news, promotions and advertising.

As mentioned, the invention provides a mobile gaming environment that complies with regulatory requirements for identification and location verification of the bettor. Moreover, the system is designed to be one hundred percent "clean" from a regulatory perspective. The software is clean in that it has not been and will not be licensed to anyone who does business illegally or otherwise operates in a "gray" area. For example, in a preferred embodiment, the software is not licensed to an entity that will illegally operate the software, or otherwise illegally do business, on the Internet. This may be desirable in that certain gaming jurisdictions will not grant gaming permits or licenses to companies that do business with, or license technology to or from, other entities known to be engaging in illegal operations.

Preferably, the system is designed such that the gaming software (or other application software operating on the system) is also one hundred percent clean from a regulatory perspective. For instance, before granting a license, a gaming jurisdiction may require that the software being used is not tainted in that it has not been used by the license applicant in violation of any laws and has not been licensed or otherwise distributed or disseminated to others who have used the software for illegal purposes, or who have been engaging in illegal activity. Therefore, it is preferred that the gaming software be clean and untainted from this perspective.

The systems and methods described herein may also be used to deliver and/or access "Rich Media" content such as, for example, sports video (live or nearly live) and audio commentary. Such may often only be distributed within specific jurisdictions. Therefore, the distribution may benefit from the inventive aspects discussed herein, particularly the location verification aspect, such as geofencing.

The gaming system and methods described herein may permit, among other things, pari-mutuel wagering, sports betting, and dissemination of news and other content. The invention also enables a casino or other gaming provider to advertise ancillary services such as shows, bars, and restaurants. The invention also enables remote reservations and purchases in connection with such services.

According to an embodiment of the invention, the gaming system provides for the dissemination of real-time odds to users accessing the system.

In another embodiment, an outcome in one transaction can trigger the presentation to the user of options for a second transaction. For example, if a user wins a predetermined amount of money playing blackjack, the user might be presented with an option to purchase retail items at a casino store or to make reservations for certain services at a club. As another example, if a user uses the system to purchase show tickets, the user might be offered to make reservations at one of several restaurants within a certain proximity to the show.

Although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

The invention claimed is:

1. A method comprising:

determining, by a computing device of a cellular telephonic communication network, that each of a plurality of cellular telephones is approved to use the cellular telephonic communication network;

determining, by the computing device, that a first subset of the plurality of cellular telephones is not approved for gaming services using the cellular telephonic communication network based on a first bundle of services to which the first subset of the plurality of cellular telephones is subscribed;

determining, by the computing device, that a second subset of the plurality of cellular telephones is approved for a first level of gaming services using the cellular telephonic communication network based on a second bundle of services to which the second subset of the plurality of cellular telephones is subscribed;

determining, by the computing device, that a third subset of the plurality of cellular telephones is approved for a second level of gaming services using the cellular telephonic communication network based on a third bundle of services to which the third subset of the plurality of cellular telephones are subscribed, in which the second level of gaming services includes an ability to place a wager;

allowing a respective level of gaming services using the cellular telephonic communication network for each of the plurality of cellular telephones based on the determined level of gaming services for which the respective cellular telephone is approved; and billing each respective subscriber of the second and third subset of the plurality of cellular telephones for usage of the cellular telephonic communication network and usage of the gaming services based on respective billing rates associated with the respective bundles of services.

2. The method of claim 1, wherein the cellular telephonic communication network includes a proprietary cellular network over which the cellular telephones may place calls.

3. The method of claim 1, wherein the gaming services comprise an add-on service that is provided as a corollary to cellular telephone service.

4. The method of claim 1, wherein determining that a first device of the second subset is approved for the first level of gaming services includes determining that the first device is approved for a bundle of services including the gaming services and one or more telecommunication service enhancements.

5. The method of claim 4, wherein at least one of the one or more telecommunication service enhancements comprise a service selected from the group consisting of text messaging, customizable ring tones, photo sharing services, video sharing services, and customizable downloads.

6. The method of claim 1, wherein billing includes generating a respective bill associated with a respective cellular telephone, in which each respective bill including an accounting of respective gaming service usage and respective cellular telephonic communication network usage for a respective cellular telephone.

7. The method of claim 1, wherein billing includes generating a respective bill associated with a respective cellular telephone, in which each respective bill includes an accounting of the respective gaming service provided to a respective cellular telephone.

8. The method of claim 1, wherein the gaming services comprise a news service.

9. The method of claim 1, wherein the gaming services comprise a gambling service that allows a user associated with a respective device to place bets.

10. The method of claim 1, wherein the gaming services comprise a virtual casino.

11. The method of claim 10, wherein the second level of gaming services includes identification of user-selected activities to be included in the virtual casino.

12. The method of claim 1, wherein at least a portion of the cellular telephonic communication network is selected from the group consisting of Code Division Multiple Access (CDMA), Time Division Multiple Access (TDMA), Global System for Mobile Communication (GSM), General Packet Radio Service (GPRS), WiFi (802.11x), WiMax (802.16x), Public Switched Telephone Network (PSTN), Digital Subscriber Line (DSL), Integrated Services Digital Network (ISDN), Blue Tooth, and cable modem.

13. The method of claim 1, comprising:

generating a respective database entry of subscriber information for each of the plurality of cellular telephones, in which each database entry identifies the respective level of gaming services, in which each database entry is based on a respective bundle of services subscribed to, and in which determining the level of gaming services for which each cellular telephone is approved includes querying the respective database entries.

14. The method of claim 1, in which each respective bundle of services associated with the second subset and third subset includes a set of telecommunication services and a set of gaming services.

15. The method of claim 1, in which the billing includes billing for each game transaction.

16. The method of claim 15, in which the billing includes billing based on a monthly fee associated with a respective bundle of services.

17. The method of claim 1, in which one first cellular telephone of the first subset of cellular telephones and at least one second cellular telephone of at least one of the second and third subsets of cellular telephones are part a same billing plan.

18. The method of claim 17, in which the billing plan includes a family plan for use of the cellular telephonic communication network.

19. The method of claim 18, in which the first cellular telephone is associated with a child and the second cellular telephone is associated with an adult.

20. The method of claim 1, in which billing a first cellular telephone of the second subset of cellular telephones includes:

determining that an amount of usage of gaming services exceeds an authorized amount of usage of the gaming services; and charging a fee for an amount of usage that exceeds the authorized amount of usage, and in which the second level of gaming services includes an unlimited amount of usage.

21. The method of claim 1, comprising:

for each cellular telephone of the third subset of cellular telephones:

determining respective interest in a respective type of gaming event, determining a respective occurrence of the respective type of gaming event, and transmitting respective information about the respective occurrence to the respective cellular telephone independently of a request for the respective information.

22. The method of claim 21, comprising:

for each cellular telephone of the third subset of cellular telephones, before transmitting the respective information, determining that the respective occurrence is in a first location and that the respective cellular telephone is in a second location proximate to the first location.

23. The method of claim 22, in which a first location is determined to be proximate to a second location when the second location is at least one of in a same city and in a same state as the first location.

24. The method of claim 21, comprising:

for each cellular telephone of the third subset of cellular telephones, before transmitting the respective information, determining that the respective cellular telephone is in a respective location in which gambling on the occurrence is legal.

25. The method of claim 24, in which the second level of gaming services includes allowing a placement of respective bets on the respective occurrence associated with the transmitted information using the respective cellular telephone.

26. The method of claim 24, comprising:

for at least one cellular telephone and at least one occurrence of a gaming event, determining that the cellular telephone is not in a location in which gambling on the occurrence is legal, and, in response, preventing the transmission of the information about the occurrence to the cellular telephone through the cellular telephonic communication network.

27. The method of claim 1, in which the first level of gaming services does not include placement of bets on games.

28. The method of claim 1, in which the second level of gaming services allows participation in games and in which the first level of gaming services does not allow participation in games.

29. The method of claim 1, in which the second level of gaming service includes a larger number of games than are included in the first level of gaming service.

* * * * *